United States Patent
Ohashi et al.

(10) Patent No.: US 12,476,795 B2
(45) Date of Patent: Nov. 18, 2025

(54) REGISTRATION TERMINAL, HOLDER TERMINAL, METHOD, AND PROGRAM

(71) Applicant: NTT, Inc., Tokyo (JP)

(72) Inventors: Shigenori Ohashi, Musashino (JP); Atsushi Nakadaira, Musashino (JP); Shigeru Fujimura, Musashino (JP); Keita Suzuki, Musashino (JP); Honoka Toda, Musashino (JP)

(73) Assignee: NTT, Inc., Tokyo (JP)

( * ) Notice: Subject to any disclaimer, the term of this patent is extended or adjusted under 35 U.S.C. 154(b) by 176 days.

(21) Appl. No.: 18/031,566

(22) PCT Filed: May 28, 2021

(86) PCT No.: PCT/JP2021/020513
§ 371 (c)(1),
(2) Date: Apr. 12, 2023

(87) PCT Pub. No.: WO2022/079940
PCT Pub. Date: Apr. 21, 2022

(65) Prior Publication Data
US 2023/0412366 A1    Dec. 21, 2023

(30) Foreign Application Priority Data
Oct. 14, 2020    (WO) .................. PCT/JP2020/038778

(51) Int. Cl.
*H04L 9/08*    (2006.01)
*G06Q 20/38*    (2012.01)
(Continued)

(52) U.S. Cl.
CPC ....... *H04L 9/0825* (2013.01); *G06Q 20/3823* (2013.01); *G06Q 20/401* (2013.01);
(Continued)

(58) Field of Classification Search
CPC ................ H04L 9/0825; H04L 9/0869; H04L 9/3213; H04L 9/3236; H04L 9/3247;
(Continued)

(56) References Cited

U.S. PATENT DOCUMENTS 10,097,356 B2    10/2018    Zinder
10,630,485 B2    4/2020    Zinder
(Continued)

FOREIGN PATENT DOCUMENTS

CA    3110828 A1 *    3/2020    ............... H04L 9/50
JP    201050760 A    3/2010
(Continued)

OTHER PUBLICATIONS

Juan Banet, "IPFS—Content Addressed, Versioned, P2P File System (Draft 3)", [online], [Retrieved on Sep. 10, 2020], Internet <URL: https://ipfs.io/ipfs/QmR7GSQM93Cx5eAg6a6yRzNde1FQv7uL6X1o4k7zrJa3LX/ipfs.draft3.pdf>.

(Continued)

*Primary Examiner* — John B King
(74) *Attorney, Agent, or Firm* — Harness, Dickey & Pierce, P.L.C.

(57) ABSTRACT

A registration terminal according to an embodiment is a registration terminal connectable to a distributed ledger network, and includes a first generation unit that generates a private key for an identifier used for generation of an identifier of a file and a public key for an identifier used for generation of the identifier, a second generation unit that generates a transaction related to generation of management information to the distributed ledger network and transmits the transaction to the distributed ledger network to generate the management information to the distributed ledger network, and a third generation unit that generates an identifier (Continued)

of a processing target file as an identifier registered in the management information by using the public key for an identifier.

9 Claims, 21 Drawing Sheets

(51) Int. Cl.
*G06Q 20/40* (2012.01)
*H04L 9/32* (2006.01)

(52) U.S. Cl.
CPC .......... *H04L 9/0869* (2013.01); *H04L 9/3213* (2013.01); *H04L 9/3236* (2013.01); *H04L 9/3247* (2013.01)

(58) Field of Classification Search
CPC ..... H04L 9/0662; H04L 9/50; G06Q 20/3823; G06Q 20/401; G06F 21/64
See application file for complete search history.

(56) References Cited

U.S. PATENT DOCUMENTS

| | | |
|---|---|---|
| 11,522,716 B2 | 12/2022 | Zinder |
| 2010/0046749 A1 | 2/2010 | Hatano et al. |
| 2016/0234026 A1* | 8/2016 | Wilkins .................. G06F 21/64 |
| 2016/0342994 A1* | 11/2016 | Davis ..................... G06Q 40/02 |
| 2017/0005804 A1 | 1/2017 | Zinder |
| 2017/0163733 A1* | 6/2017 | Grefen .................. H04L 9/3236 |
| 2018/0232526 A1* | 8/2018 | Reid ..................... G06F 21/6218 |
| 2019/0028280 A1 | 1/2019 | Zinder |
| 2019/0347433 A1* | 11/2019 | Chakravorty ............. H04L 9/30 |
| 2020/0186338 A1* | 6/2020 | Andon .................... G06F 7/588 |
| 2020/0213132 A1 | 7/2020 | Zinder |
| 2022/0171743 A1 | 6/2022 | Ohashi et al. |
| 2023/0370280 A1* | 11/2023 | Fujimura ............... H04L 9/3247 |

FOREIGN PATENT DOCUMENTS

| | | |
|---|---|---|
| JP | 2018530175 A | 10/2018 |
| JP | 2020144586 A | 9/2020 |

OTHER PUBLICATIONS

Michael Chan, "Build a simple Ethereum + InterPlanetary File System (IPFS) + React.js DApp.", [online], [Retrieved on Sep. 10, 2020], Internet <URL: https://itnext.io/build-a-simple-ethereum-interplanetary-file-system-ipfs-react-js-dapp-23ff4914ce4e>.

Chikada, Masayoshi et al., "Cross-organizational document sharing system utilizing blockchains", ISP J SIG Technical Report, Jul. 10, 2019, vol. 119, No. 123, pp. 7-12, in particular, p. 10, left col. line 29 to p. 11, left column line 9, fig. 2, 3, etc., entire text, all drawings.

* cited by examiner

REGISTRATION TERMINAL, HOLDER TERMINAL, METHOD, AND PROGRAM

CROSS-REFERENCE TO RELATED APPLICATIONS

This application is a 371 U.S. National Phase of International Application No. PCT/JP2021/020513, filed on May 28, 2021, which claims the benefit of International Application No. PCT/JP2020/038778, filed on Oct. 14, 2020. The entire disclosures of the above applications are incorporated herein by reference.

TECHNICAL FIELD

Embodiments of the present invention relate to a registration terminal, a holder terminal, a method, and a program.

BACKGROUND ART

In a transaction of an encrypted currency represented by a bitcoin (registered trademark), a blockchain that is one kind of a distributed ledger technology (DLT) of a decentralized type is used. Because the blockchain has high robustness against tampering, it has been studied to use various applications such as smart contract capable of executing various contracts or transactions in addition to the cryptocurrency.

As a programmable blockchain that can handle smart contracts, for example, there is Ethereum that can execute a general-purpose distributed application program.

In a distributed ledger technology capable of realizing various smart contracts, there is a distributed ledger in which transactions are collected in block. Because such a distributed ledger has a data structure in which blocks are linked by a hash, this is not suitable for management of a file having a large data size.

In the distributed ledger technology, transactions are not collected in the blocks, but there is a distributed ledger expressed by a connection of transactions. However, because such a distributed ledger has a structure in which past transactions are left, this is not suitable for the management of the file.

As a method of distributed file management, there is, for example, a storage for managing a file by using a unique identifier (ID) generated from a content hash or the like (see Non Patent Literature 1, for example). Further, there is also a method of registering a file in the storage and recording and managing an ID of the file on a distributed ledger (see Non Patent Literature 2, for example).

CITATION LIST

Non Patent Literature

NON PATENT LITERATURE 1: Juan Banet, "IPFS—Content Addressed, Versioned, P2P File System (DRAFT 3)", [online], [Retrieved on Sep. 10, 2020], Internet <URL: https://ipfs.io/ipfs/QmR7GSQM93Cx5eAg-6a6yRzNde1FQv7uL6X1o4k7zrJa3LX/ipfs.draft3. pdf>
NON PATENT LITERATURE 2: Micheal Chan, "Build a simple Ethereum+InterPlanetary File System (IPFS)+React.js DApp.", [online], [Retrieved on Sep. 10, 2020], Internet <URL: https://itnext.io/build-a-simple-ethereum-interplanetary-file-system-ipfs-react-js-dapp-23ff4914ce4e>

SUMMARY OF THE INVENTION

Technical Problem

When a hash value of a file and an identifier corresponding to the hash value are recorded on the distributed ledger, association verification with information managed in the distributed ledger can be made for the file, but when the file is corrected even a little and hash values compared in the association verification are different from each other, the association cannot be confirmed.

Thus, when the association cannot be confirmed, it cannot be determined whether a leaked file is a file edited by a regular user or a file edited by an unauthorized user.

Because the file is modified in processing of management, distribution, and analysis, it is necessary to keep modifying a distributed ledger each time the file is edited, and relatively high rewriting performance is required in order for a file to be associated and managed by a normal hash value and an identifier corresponding to this hash value.

In addition, when the association between the file and the management information is secured by updating the file to the distributed ledger, and when a company receives data and uses the data, an actual state of data management in the company is recorded in the distributed ledger.

Even when files are distributed and processed or corrected off-line, a method of confirming the association with the management information is required when editing is performed by a regular user.

The present invention has been made in view of the circumstance, and an object of the present invention is to provide a registration terminal, a holder terminal, a method, and a program making it possible to confirm association with management information when a file is edited by a regular user.

MEANS FOR SOLVING TO PROBLEM

A registration terminal according to an aspect of the present invention is a registration terminal connectable to a distributed ledger network, the registration terminal including: a first generation unit configured to generate a private key for an identifier used for generation of an identifier of a file and a public key for an identifier used for generation of the identifier; a second generation unit configured to generate a transaction related to generation of management information to the distributed ledger network and transmit the transaction to the distributed ledger network to generate the management information to the distributed ledger network; and a third generation unit configured to generate an identifier of a processing target file as an identifier registered in the management information by using the public key for an identifier.

A registration terminal according to an embodiment of the present invention is a registration terminal connectable to a distributed ledger network in which a token including an identifier of a processing target file is held, the registration terminal including: a random number generation unit configured to generate a random number used for generation of an identifier of a processing target file after update on the basis of a private key for an identifier used for generation of the identifier, the processing target file before update, a random number used for generation of an identifier of the processing target file before update, and the processing target file after update; and an information generation unit configured to generate information in which the random number generated by the random number generation unit is set in the processing target file after update.

A holder terminal according to an embodiment of the present invention is a file holder terminal connectable to a distributed ledger network in which management information including an identifier of a processing target file is held, wherein information on access to the management information, an electronic signature, and a public key used for verification of the electronic signature are associated with the processing target file, and the file holder terminal includes: a verification unit configured to verify the electronic signature described in the processing target file by using a public key described in the processing target file and used for verification of the electronic signature; an acquisition unit configured to acquire the file identifier from the management information by using the information on access to the management information described in the processing target file; a generation unit configured to generate an identifier of the processing target file by using the public key for an identifier described in the processing target file; and a determination unit configured to determine that the identifier acquired by the acquisition unit matches the identifier generated by the generation unit.

A registration method according to an aspect of the present invention is a method performed by a registration terminal connectable to a distributed ledger network, the method including: generating a private key for an identifier used for generation of an identifier of a file and a public key for an identifier used for generation of the identifier; generating a transaction related to generation of management information to the distributed ledger network and transmitting the transaction to the distributed ledger network to generate the management information to the distributed ledger network; and generating an identifier of a processing target file as an identifier registered in the management information by using the public key for an identifier.

Advantageous Effects of the Invention

According to the present invention, it is possible to confirm association with the management information when a file is edited by a regular user.

DESCRIPTION OF EMBODIMENTS

Hereinafter, embodiments according to the preset invention will be described with reference to the drawings.

First Embodiment

Firstly, a first embodiment of the present invention will be described.

Figure 1:
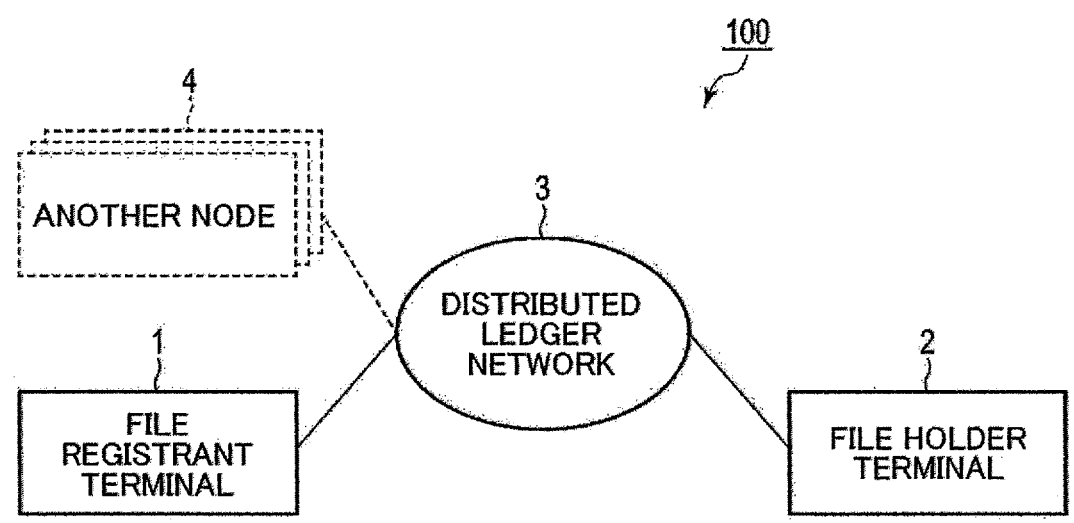
FIG. 1 illustrates an application example of a management system according to a first embodiment of the present invention.

FIG. 1 is a diagram illustrating an application example of a management system according to the first embodiment of the present invention.

As illustrated in FIG. 1, a management system 100 according to the first embodiment of the present invention includes a file registration terminal 1 and a file holder terminal 2, the respective terminals can be connected via a distributed ledger network 3 which may be simply called a distributed ledger network, and the respective terminals can communicate with each other.

The file registration terminal 1 and the file holder terminal 2 have access functions to the distributed ledger network 3, and a private key associated with each account is under the management of a user, a file registrant and a file holder. A place in which the private key is stored is not designated particularly.

The distributed ledger network 3 is configured of a plurality of terminals. The file registration terminal 1 and the file holder terminal 2 may have a node function for maintaining the distributed ledger network 3. Further, a terminal for substituting the node function may be provided between the distributed ledger network 3, the file registration terminal 1, and the file holder terminal 2.

The node function is a function of performing verification processing and approval processing of transaction of the network, and updating and holding of register information (block information and state database).

The file registration terminal 1 and the file holder terminal 2 may be the same terminal.

In addition to the file registration terminal 1 and the file holder terminal 2, a terminal for substituting the node function may exist in the distributed ledger network 3. This terminal is called another node. In the example illustrated in FIG. 1, another node 4 for maintaining the distributed ledger network 3 may exist. When the other node 4 that substitutes for the node function exists, the file registration terminal 1 and the file holder terminal 2 may not have the node function. In the present embodiment, a case in which the file registration terminal 1 and the file holder terminal 2 also execute the node function will be described.

Figure 2:
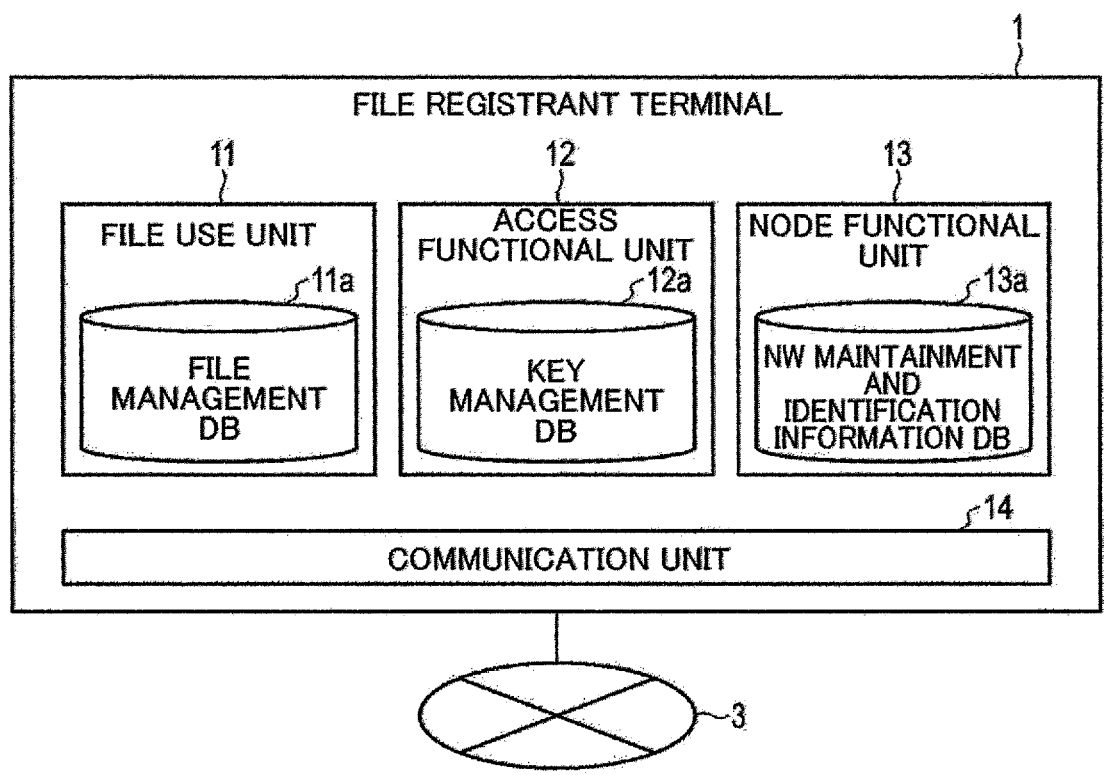
FIG. 2 is a block diagram illustrating an example of a functional configuration of a file registration terminal.

FIG. 2 is a diagram illustrating an example of a functional configuration of the file registration terminal.

As illustrated in FIG. 2, the file registration terminal 1 includes a file use unit 11, an access functional unit 12, a node functional unit 13, and a communication unit 14.

The file use unit 11 includes a file management DB (database) 11a, the access functional unit 12 includes a key management DB 12a, and the node functional unit 13 includes a network (NW) maintenance and identification information DB 13a. Various databases in the present embodiment are also referred to as a storage.

The file use unit 11 performs management of files, such as generation, updating, or use, and stores data to be managed in a file management DB 11a. The file use unit 11 also performs management of keys necessary for the file management.

The access functional unit 12 performs issuance of the transaction to the network and transmission/reception of file to/from another terminal. The access functional unit 12 stores information of keys to be used for access in the key management DB 12a.

The node functional unit 13 executes the node function, and stores information for network maintenance and identification in processing in the network (NW) maintenance and identification information DB 13a.

The communication unit 14 performs communication with the outside.

Figure 3:
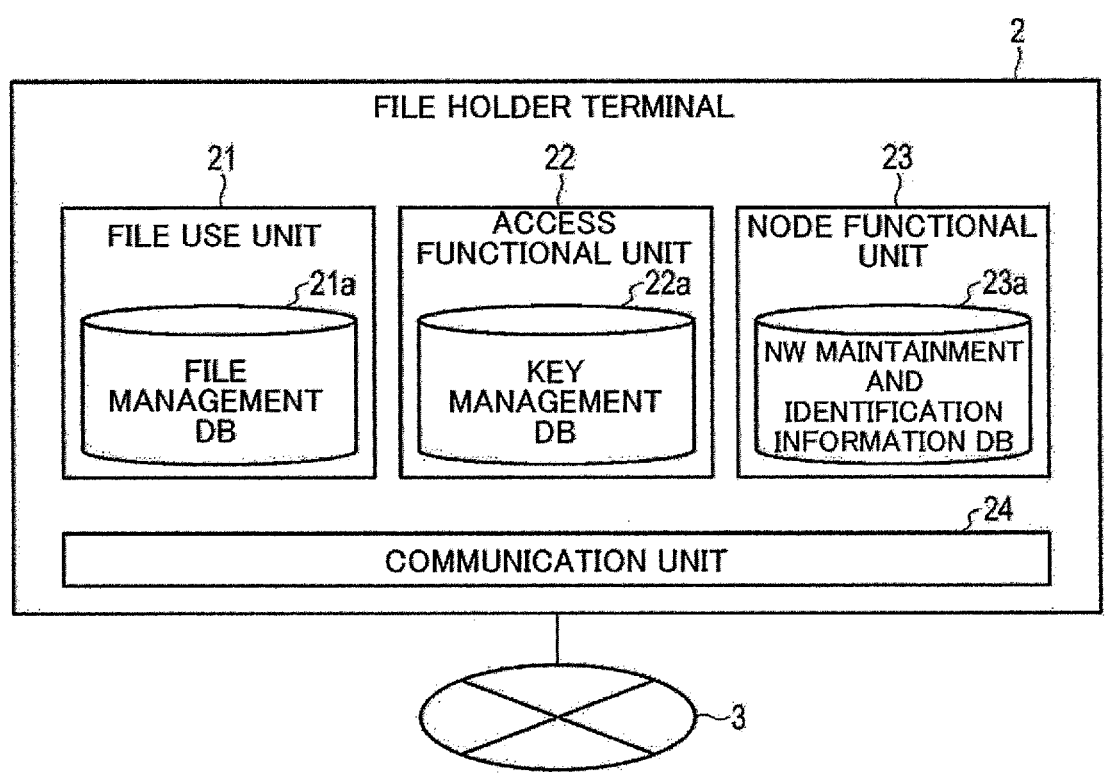
FIG. 3 is a block diagram illustrating an example of a functional configuration of a file holder terminal.

FIG. 3 is a diagram illustrating an example of a functional configuration of the file holder terminal.

As illustrated in FIG. 3, the file holder terminal 2 includes a file use unit 21, an access functional unit 22, a node functional unit 23, and a communication unit 24.

The file use unit 21 includes a file management DB 21a, the access functional unit 22 includes a key management DB 22a, and the node functional unit 23 includes a network (NW) maintenance and identification information DB 23a.

The file use unit 21 performs the same processing as the file use unit 11 and stores data to be managed in the file management DB 21a.

The access functional unit 22 performs the same processing as the access functional unit 12, and stores information of the key used for access in the key management DB 22a.

The node functional unit 23 executes the node function, and stores information for network maintenance and identification in the network (NW) maintenance and identification information DB 23a.

The communication unit 24 performs communication with the outside.

Figure 4:
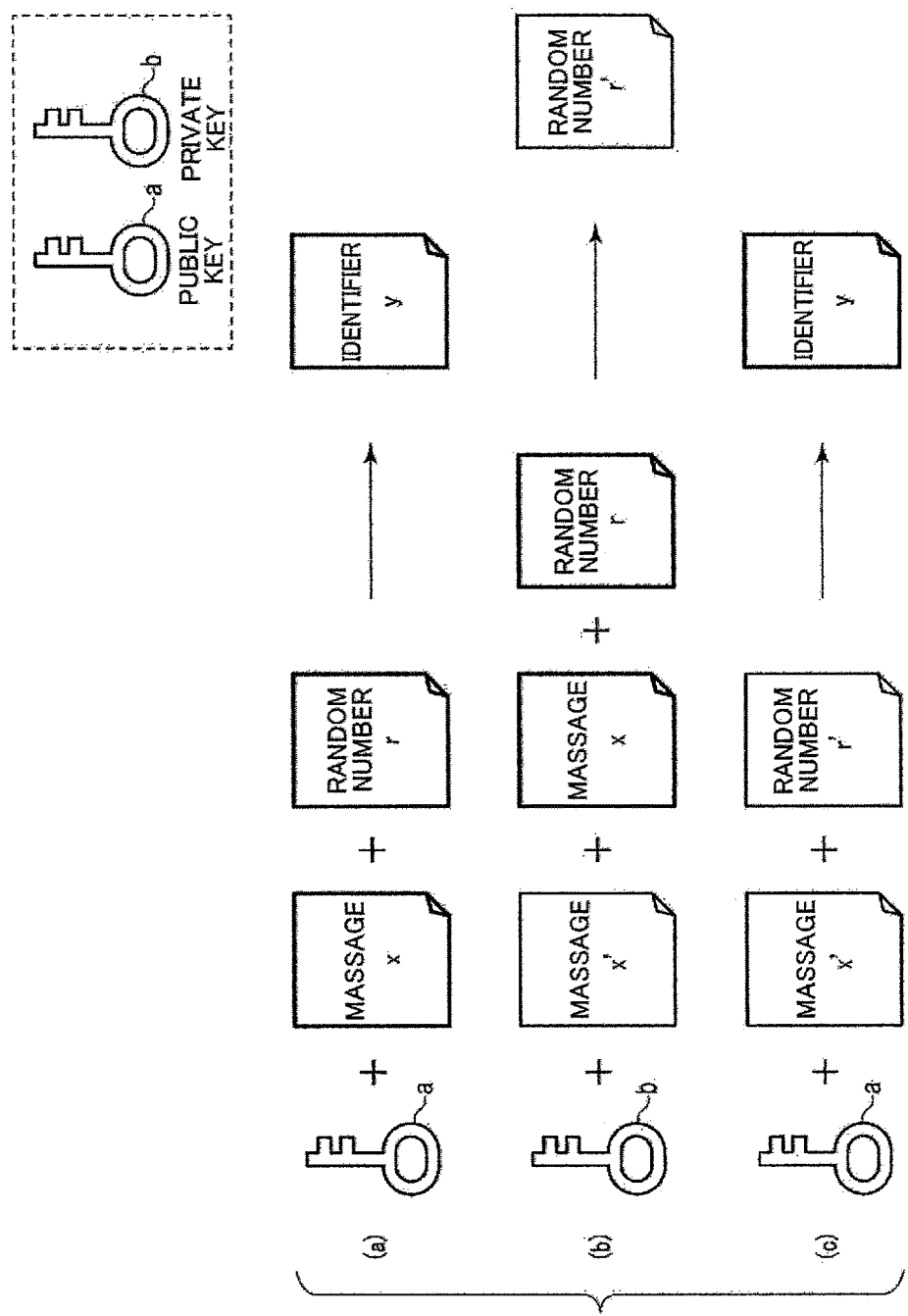
FIG. 4 is a diagram illustrating an example of generation of a file identifier and the like used in the first embodiment of the present invention.

FIG. 4 is a diagram illustrating an example of the file identifier used in the first embodiment of the present invention.

In the present embodiment, the file identifier is used in the processing indicated by FIGS. 4(a) to 4(c) for linking the processing target file and the management information. In the present embodiment, the processing target file may be referred to as "message".

First, as illustrated in FIG. 4(a), an identifier y is generated by a combination of the public key corresponding to a symbol a in FIG. 4, a message x before update, and a random number r. In FIG. 4, the public key corresponding to the symbol a and the random number r are a public key and a random number for generating the identifier y.

Second, as illustrated in FIG. 4(b), a random number r to be used for generation of an identifier of a message x' after update is generated by a combination of a private key corresponding to a symbol b in FIG. 4, the message x' after update, the message x before update, and the random number r. The private key corresponding to a symbol b in FIG. 4 is generated in pairs with the public key corresponding to the symbol a in FIG. 4.

Third, as illustrated in FIG. 4(c), the identifier y is generated by a combination of the public key corresponding to the symbol a in FIG. 4, the message x' after update, and the random number r' used for generation of the identifier of the message after update. The identifier y is the same identifier for the message before and after the update.

That is, in the present embodiment, a random number, such as a chameleon hash, which is a character string that allows only a user having a private key to output the same identifier for different messages, that is, messages before and after update can be generated.

Further, an electronic signature is used to identify a user who has edited the message among users who have the right to edit the message.

Figure 5:
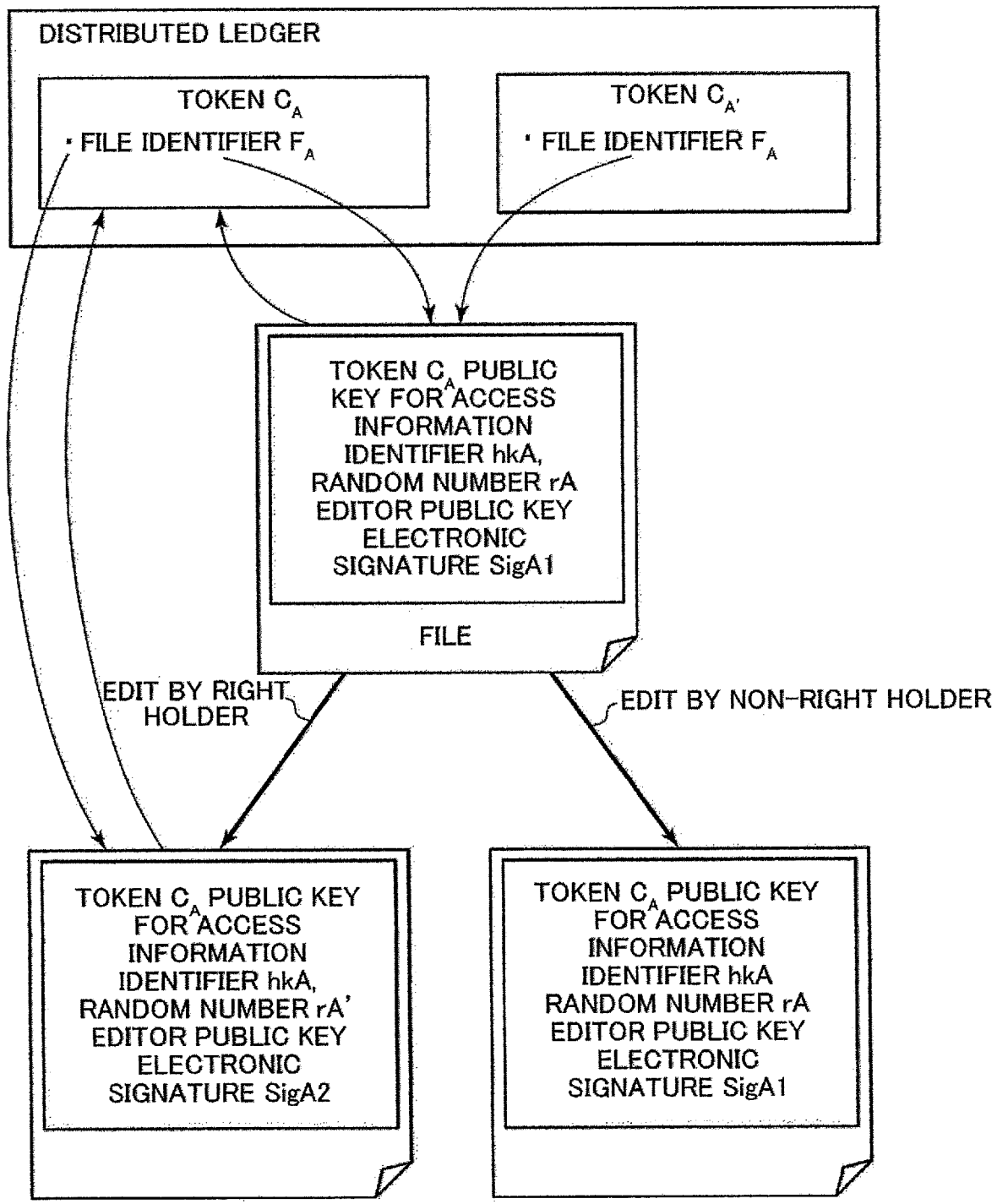
FIG. 5 is a diagram illustrating an example of information managed in a distributed ledger and information managed in a file used in the first embodiment of the present invention.

FIG. 5 is a diagram illustrating an example of information managed in a distributed ledger and information managed in a file used in the first embodiment of the present invention.

In the example illustrated in FIG. 5, in the distributed ledger, a token $C_A$ and a token $C_A'$ are managed, and a file identifier $F_A$ is managed in each token.

In this embodiment, information on access to the token CA is embedded in the header of each file.

In the present embodiment, a correct relationship between the token and the file can be confirmed by recording an ID of the file, that is, an identifier generated from a hash in the token.

For example, by using the information on access to the token $C_A$, it is possible to access the identifier in the token $C_A$ from the file in which this access information is embedded, and it can be confirmed that this token $C_A$ is a correct token. On the other hand, access to the identifier in the token $C_A'$ cannot be performed from the file in which the information on access to the token $C_A$ is embedded. From this, it can be confirmed that this token $C_A'$ is not a correct token.

Further, in the example illustrated in FIG. 5, in the file before editing (update), the information on access to the token $C_A$, a public key $hk_A'$ for an identifier, a random number $R_A$, an editor public key for specifying an editor of the file, and an electronic signature SigAl are managed. The public key $hk_A'$ for an identifier corresponds to the public key shown in FIG. 4, and the random number $R_A$ corresponds to the random number r shown in FIG. 4.

Further, in the file edited by the right holder who is a user who has a right to edit the file, the information to access on the token $C_A$, the public key $hk_A'$ for an identifier, the random number $r_A'$, the editor public key, and a new electronic signature $Sig_{A2}$ are managed. The random number $R_A'$ corresponds to the random number r' illustrated in FIG. 4.

Because association can be made by the same file identifier as the file identifier associated with the file before update when the file is edited by a right holder having the private key, update is not required for each distributed ledger.

Further, assignment of the electronic signature to the file makes it possible for a user who has edited the file to be discriminated among right holders.

<File Registration: Normal Storage>

Next, processing for file registration in a normal storage in the management system according to the present embodiment will be described. This registration processing is processing in which an identifier related to a processing target file is registered in a token on the distributed ledger network.

In the present embodiment, the storage used in each terminal is divided into a normal storage and a storage in which a file is converted into a directed acyclic graph (DAG). The normal storage is a storage in which a file is not converted into a DAG. The storage in which a file is converted into a DAG is, for example, an InterPlanetary File System (IPFS).

Figure 6:
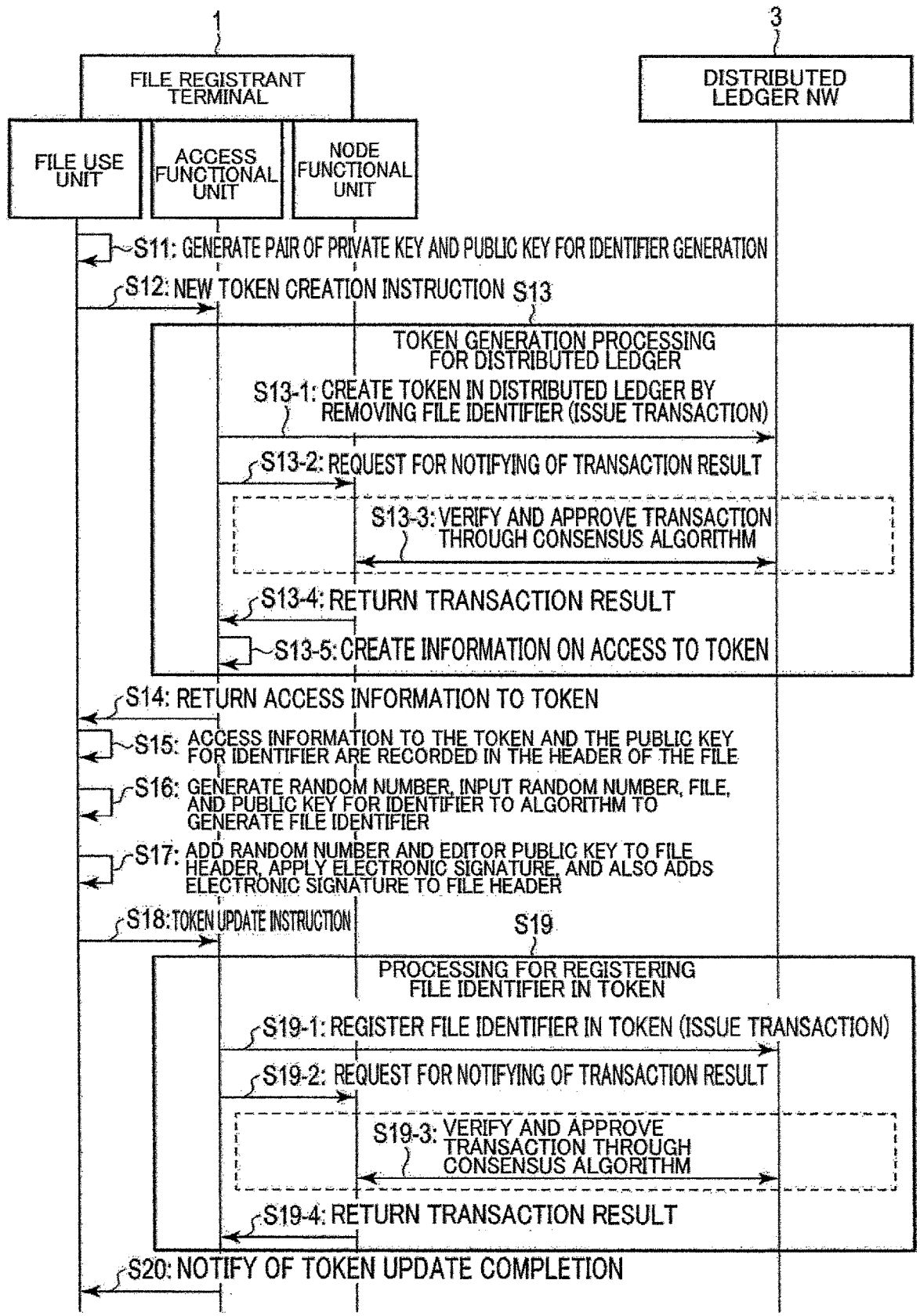
FIG. 6 is a diagram illustrating a sequence for describing an example of processing for file registration in a normal storage.

FIG. 6 is a diagram illustrating a sequence for describing an example of processing for file registration in a normal storage.

(1) The file use unit 11 of the file registration terminal 1 generates a pair of private key for identifier generation of a processing target file (which may be referred to as a private key for an identifier) and public key for identifier generation (which may be referred to as a public key for an identifier), which are stored in the file management DB 11a (S11).

Further, in the present embodiment, it is assumed that a pair of an editor private key used for specifying of an editor of a file and an editor public key used for specifying is generated in advance, and the editor public key is registered in the distributed ledger or an authentication organization, as necessary.

(2) The file use unit 11 of the file registration terminal 1 instructs the access functional unit 12 to generate a token with respect to the distributed ledger (S12). In response to the instruction, the access functional unit 12 of the file registration terminal 1 performs token generation processing with respect to the distributed ledger (S13).

Specifically, the access functional unit 12 creates a transaction for generating a token to the distributed ledger without including the file identifier, and broadcasts the transaction to the distributed ledger network 3 via the communication unit 14 (S13-1). The access functional unit 12 sends a notification request of a transaction result to the node functional unit 13 (S13-2).

Then, in response to a request from the node functional unit 13, the transaction is verified by a consensus algorithm in the distributed ledger network 3. When the transaction satisfies a predetermined requirement, the transaction is approved (confirmed) (S13-3).

When the node functional unit 13 receives the result of the transaction from the distributed ledger network 3 through the communication unit 14, the node functional unit 13 returns the result to the access functional unit 12 (S13-4), and in response to the result, the access functional unit 12 creates "the information on access to the token" for the processing target file (S13-5). The processing of S13 is thus completed.

The access functional unit 12 returns the created "the information on access to the token" to the file use unit 11 (S14).

(3) The file use unit 11 records "the information on access to the token" returned in S14 and the "public key for an identifier" generated in S11 on a header of the processing target file (which may be referred to as a file header) (S15). In the present embodiment, the state of the file in this case is called "state A". That is, here, information in which "the information on access to the token" and the "public key for an identifier" are set in the processing target file is generated.

This "state A" indicates a state in which "the information on access to the token" and "public key for an identifier" have been recorded in the header of the file regardless of updated content of the file. Therefore, there are a file before update (state A) and a file after update (state A).

(4) The file use unit 11 generates a random number, inputs the "random number", the "file (state A)" and the "public key for an identifier" to an algorithm, and generates a "file identifier" such as a chameleon hash of the processing target file (S16).

(5) The file use unit 11 adds the "random number" and the "editor public key" generated in S15 to a file header, applies an electronic signature to header information including at least the random number and the editor public key, and also adds the "electronic signature" to the file header (S17). That is, here, a random number and an editor public key are is further set in information in which "the information on access to the token" and the "public key for an identifier" have been set in the processing target file, and an electronic signature is applied thereto is generated.

(3) to (5) above may be replaced with (3a) to (5a) below.

(3a) The file use unit 11 records "the information on access to the token" returned in S14 and the "public key for an identifier" generated in S11 on the access information file which is a file different from the processing target file (S15). The file use unit 11 stores the processing target file and the access information file in one folder file. In the present embodiment, the state of the processing target file in this case is called "state A".

This "state A" indicates a state in which "the information on access to the token" and the "public key for an identifier" are recorded on the access information file regardless of updated content of the processing target file.

(4a) The file use unit 11 generates a random number, inputs the "random number", "a folder in which the processing target file (state A), and the like are stored, or a hash of the folder" and the "public key for an identifier" to the algorithm, and generates a "file identifier" such as a chameleon hash of the processing target file (S16).

(5a) The file use unit 11 records the "random number" and the "editor public key" generated in S15 in a metadata file different from the access information file or the like, applies an electronic signature to at least the random number and the editor public key, records the "electronic signature" in the metadata file, stores the folder and the metadata file in one new upper folder, and creates a file in which the folder is archived by a scheme such as Tar or a file in which the folder is compressed by a scheme such as Zip (S17).

(6) The file use unit 11 sends an instruction to update the token and, in this case, to register the file identifier with respect to the token to the access functional unit 12 (S18). In response to the instruction, the access functional unit 12 performs file identifier registration processing with respect to the token related to "the information on access to the token" managed in the distributed ledger (S19).

Specifically, the access functional unit 12 creates a transaction for registering the file identifier in the token managed in the distributed ledger network 3, and broadcasts the transaction to the distributed ledger network 3 via the communication unit 14 (S19-1). The access functional unit 12 sends a notification request of a transaction result to the node functional unit 13 (S19-2).

Next, in response to a request from the node functional unit 13, the transaction is verified by a consensus algorithm in the distributed ledger network 3. When the transaction satisfies a predetermined requirement, the transaction is approved (S19-3).

When the node functional unit 13 receives the result of the transaction from the distributed ledger network 3 through the communication unit 14, the node functional unit 13 returns the result to the access functional unit 12 (S19-4). Thus, the file identifier is recorded in the token in S19. In response to the result, the access functional unit 12 notifies the file use unit 11 of update completion of the token (S20).

In the present embodiment, the editor public key may not be added to the file header, and the file header may not be provided with an electronic signature.

<File Update: Normal Storage>

Figure 7:
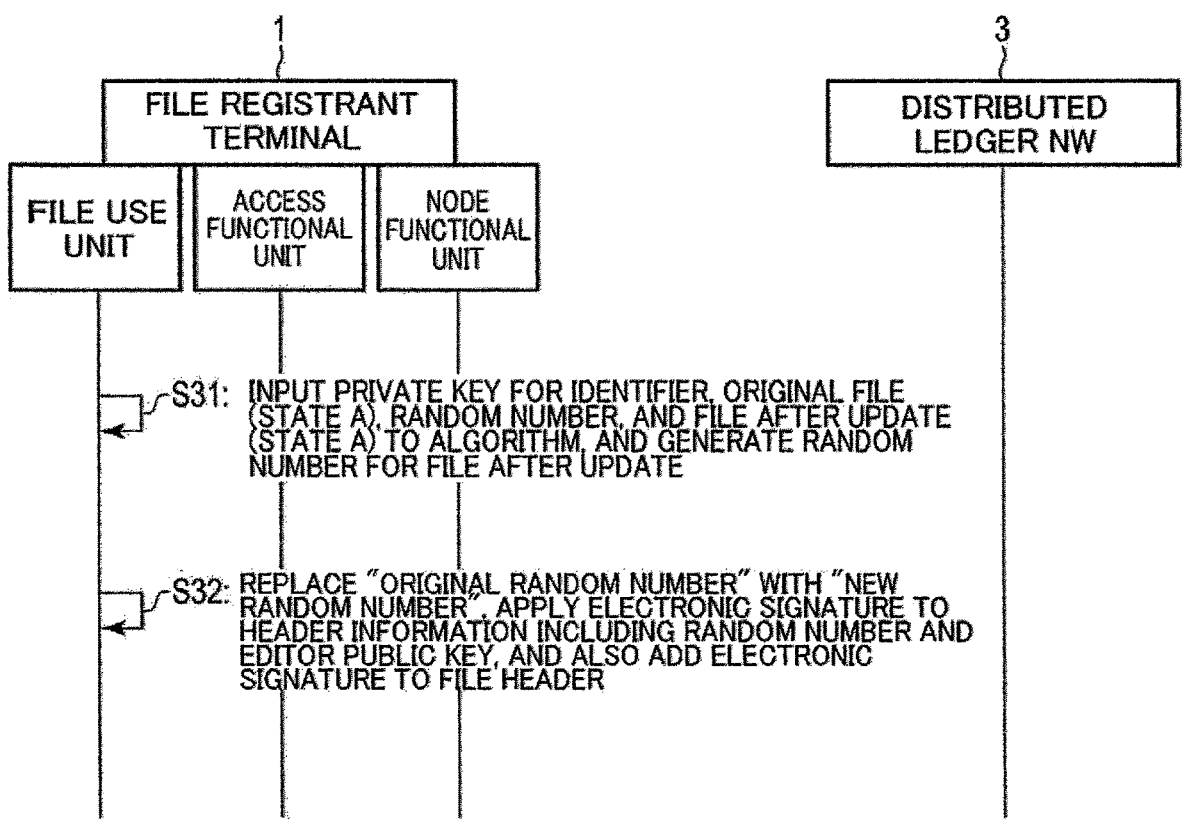
FIG. 7 is a diagram illustrating a sequence for describing an example of file update processing for a normal storage.

Next, file update processing in the normal storage in the management system according to the present embodiment will be described. This update processing is processing for updating information recorded in the header of the file when the processing target file is updated. FIG. 7 is a diagram illustrating a sequence for describing an example of file update processing for a normal storage.

(1) When content of the processing target file is updated, the file use unit 11 of the file registration terminal 1 inputs the "private key for an identifier" generated in S11, an "original file before update (state A)", "a random number used for generation of the file identifier of the file before update (which may be an original random number or a random number before update)" added to the file header in S17, and the "file after update (state A) to an algorithm, and generates a "new random number for a file after update (which may be referred to as a random number after update)" (S31).

The new random number for a file after update is a random number that is used for generation of the file identifier of a file after update.

(2) The file use unit 11 replaces "the original random number before update" with "new random number" generated in S31, applies an electronic signature to header information including at least the random number and the editor public key as in S17, and adds the electronic signature to the file header (S32).

In the update processing, because the file identifier is not updated even when the file is updated, it is not necessary to update an identifier on the distributed ledger network.

When the processing target file is a file which is stored in a folder together with the access information file and archived or compressed, (1) and (2) in the update processing can be replaced with (1a) and (2a) below.

(1a) When the content of the processing target file is updated, the file use unit 11 of the file registration terminal 1 inputs the "private key for an identifier" generated in S11, an "original folder that is a folder in which the original file before update (state A) is stored together with the access information file, or a hash of the folder", "a random number used for generation of the file identifier of the file before update (an original random number or a random number before update) added to added to a file header in S17", and a "folder in which the file after update (state A) is stored together with the access information file or a hash of the folder" to an algorithm, and generates a "new random number for a file after update (as a random number after update)" (S31).

(2a) The file use unit 11 records the "new random number" generated in S31 in the metadata file, applies an electronic signature to at least the random number and the editor public key as in S17, additionally records the electronic signature on the metadata file, stores a folder in which the file after update or the like is stored and the metadata file in one upper new folder, and generates a file in which the folder is archived or compressed (S32).

<Registration of File (Chunk): Storage (IPFS or the Like) in which File is Converted into a DAG>

Figure 8:
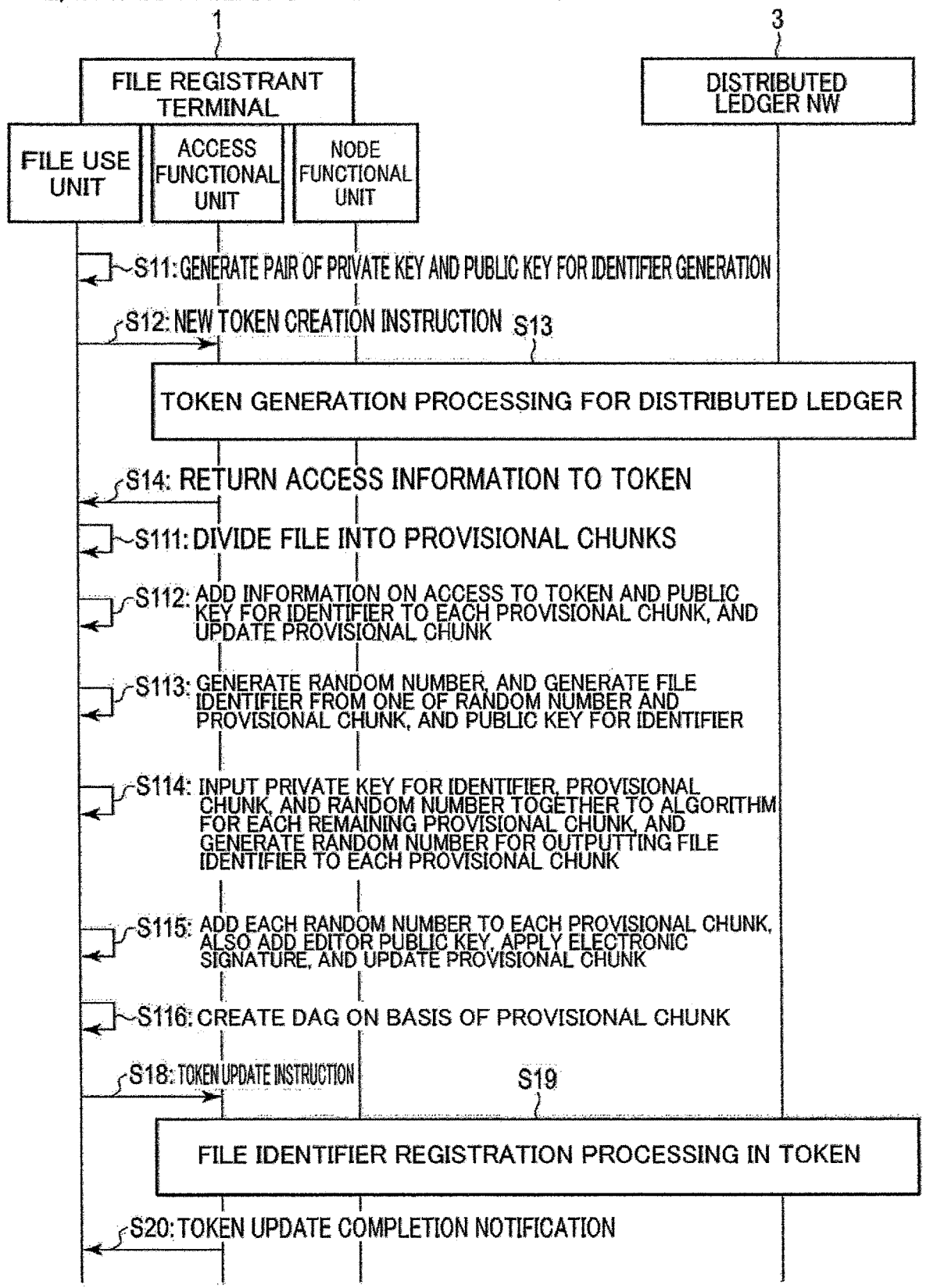
FIG. 8 is a diagram illustrating a sequence for describing an example of file registration processing for a storage in which a file is converted into a DAG.

Next, processing of registering a file in a storage in which the file is converted into a DAG in the management system according to the present embodiment will be described. FIG. 8 is a diagram illustrating a sequence for describing an example of file registration processing for a storage in which a file is converted into a DAG.

(1) First, as described in S11, a pair of a private key for identifier generation of a processing target file and a public key for identifier generation is generated by the file use unit 11 of the file registration terminal 1, similarly to the file registration processing with respect to the normal storage.

(2) Then, as described in S12, the access functional unit 12 is instructed to generate the token to the distributed ledger. Then, as described in S13, processing for token generation in the distributed ledger is performed.

Next, as described in S14, the created "the information on access to the token" is returned to the file use unit 11.

(3) After S14, the file use unit 11 of the file registration terminal 1 divides the processing target file into provisional chunks (Sill).

(4) The file use unit 11 adds "the information on access to the token" returned in S14 and the "public key for an identifier" generated in S11 to each provisional chunk to update the provisional chunk (S112). Accordingly, a provisional chunk in state A is generated.

(5) The file use unit 11 generates a random number, inputs the "random number", "one of a plurality of provisional chunks in state A", and the "public key for an identifier" generated in S11 to an algorithm, and generates the file identifier of the processing target file (S113). This file identifier corresponds to the identifier y illustrated in FIG. 4(*a*).

(6) The file use unit 11 inputs the "private key for an identifier", the "provisional chunk" handled in S113, and the "random number" generated in S113 together to the algorithm for each remaining provisional chunk in state A, and generates a new random number for outputting the file identifier generated in S113 for each remaining provisional chunk (S114). This random number corresponds to the random number r' illustrated in FIG. 4(*b*).

(7) The file use unit 11 adds the random number generated in S114 to each corresponding provisional chunk, further adds an editor public key to each provisional chunk, and applies an electronic signature to the random number and the editor public key to update each provisional chunk again and output a result thereof (S115).

(8) The file use unit 11 creates a file converted into the DAG on the basis of each provisional chunk output in S115 (S116).

(9) An instruction to update the token is performed similarly to S18, and the file identifier is registered in the token similarly to S19. The completion of the update of the token is notified similarly to S20.

In the registration processing, at least the random number and the public key for an identifier are added to each chunk in division into chunks when a file is converted into a DAG.

Further, an editor public key may not be added to each provisional chunk, and an electronic signature may not be applied to each provisional chunk.

(4) to (8) above in this registration processing may be replaced with (4a) to (8a) below.

(4a) The file use unit 11 records "the information on access to the token" returned in S14 and the "public key for an identifier" generated in S11 on an access information file different from the provisional chunk for each provisional chunk, and stores the provisional chunk and the access information file in one folder to update the provisional chunk (S112). Accordingly, a provisional chunk in state A is generated.

(5a) The file use unit 11 generates a random number, inputs the "random number", "one of a plurality of provisional chunks in state A", and the "public key for an identifier" generated in S11 to an algorithm, and generates the file identifier of the processing target file (S113).

(6a) The file use unit 11 inputs the "private key for an identifier", the "provisional chunk" handled in S113, and the "random number" generated in S113 together to the algorithm for each remaining provisional chunk in state A, and generates a new random number for outputting the file identifier generated in S113 for each remaining provisional chunk (S114).

(7a) The file use unit 11 records the random number generated in S114 on the metadata file, additionally records an editor public key on the metadata file, applies an electronic signature to the random number and the editor public key, also records the electronic signature on the metadata file, and generates one new upper folder in which the folder and the metadata file are stored, to update each provisional chunk again and output a result thereof (S115).

(8) The file use unit 11 generates a file in which the folder generated in S115 is compressed or archived for each of the provisional chunks, and generates a file converted into a DAG on the basis of each file (S116).

<File Update (Chunk): Storage (IPFS or the Like) in which File is Converted to DAG>

Figure 9:
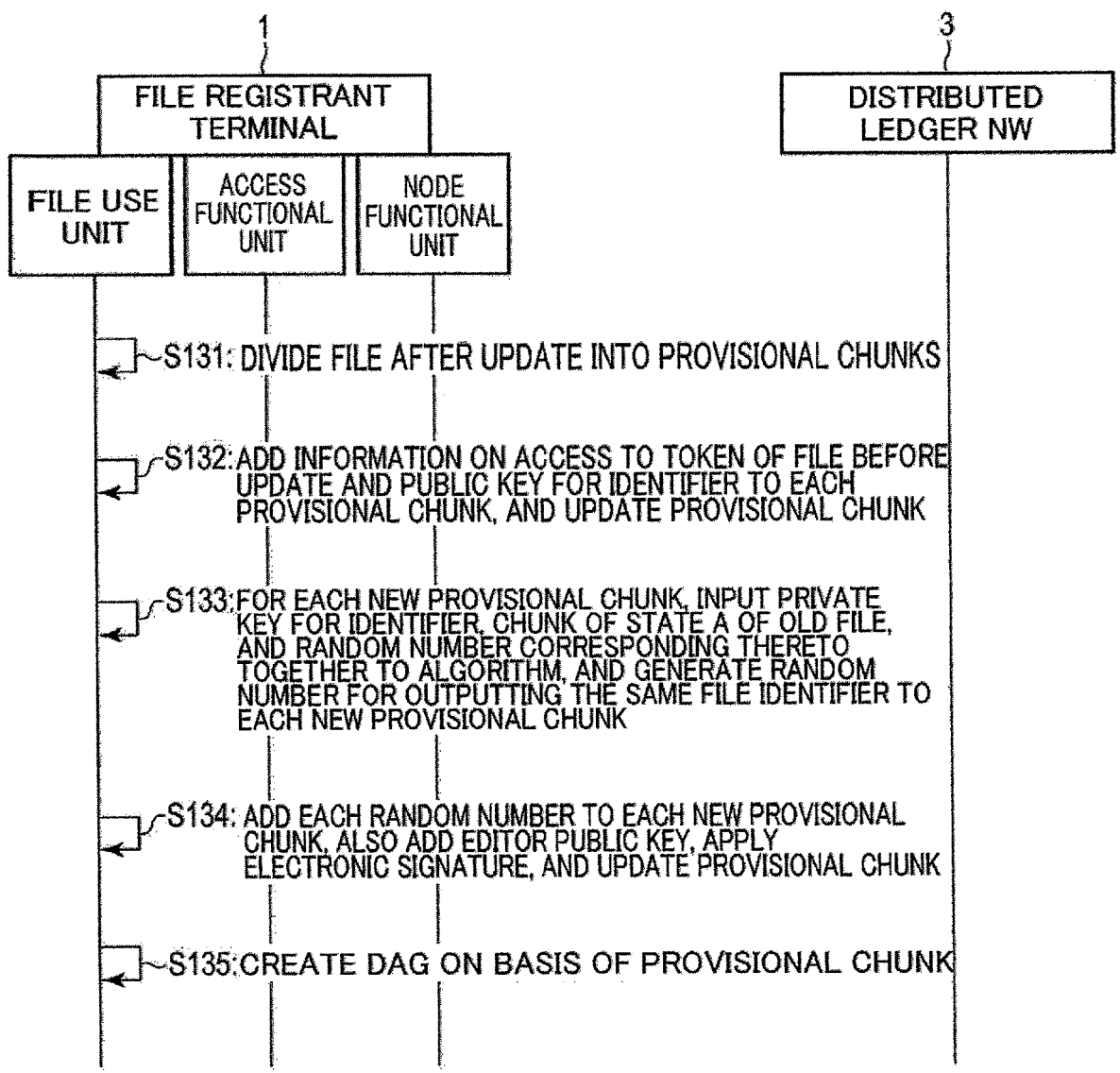
FIG. 9 is a diagram illustrating a sequence describing an example of the file update processing for a storage in which a file is converted into a DAG.

Next, processing for updating the file (chunk) to the storage in which the file is converted into a DAG in the management system according to the embodiment will be described. FIG. 9 is a diagram illustrating a sequence for describing an example of the file update processing for a storage in which a file is converted into a DAG.

(1) The file use unit 11 of the file registration terminal 1 divides the processing target file after update into provisional chunks (S131). Accordingly, a new provisional chunk is generated.

(2) The file use unit 11 adds the "information on access the token" of the file before update and the "public key for an identifier" to each new provisional chunk generated in S131 to update the provisional chunk (S132). Thus, a "chunk in state A of the file before update (which may also be referred to as an old file)" is generated.

(3) The file use unit 11 inputs, for each new provisional chunk generated in S131, the "private key for an identifier" generated in S11, the "chunk of the file (state A) before update" generated in S132, and the random number used for generation of the file identifier of the file before update corresponding to the chunk together to an algorithm, and generates a new random number for outputting the same file identifier to each new provisional chunk generated in S131 (S133).

The generated random number is a random number that is used for generation of the file identifier of a file after update.

(4) The file use unit 11 adds the random number generated in S133 to each corresponding new provisional chunk, further adds an editor public key to each provisional chunk, applies an electronic signature to the random number and the editor public key to update and output the provisional chunk (S134).

(5) The file use unit 11 creates a file converted into the DAG on the basis of the provisional chunk output in S134 (S135).

When the chunk of the file that is a processing target is a chunk that is stored in the folder together with the access information file and is archived or compressed, (2) to (5) above in the update processing can be replaced with (2a) to (5a) below.

(2a) The file use unit 11 records "the information on access to the token" of the file before update and the " public key for an identifier" on the access information file different from the provisional chunk for each new provisional chunk generated in S131, and stores the provisional chunk and the access information file in one folder to update the provisional chunk (S132). Thus, a "chunk in state A of the file before update" (old file) is generated.

(3a) The file use unit 11 inputs, for each new provisional chunk generated in S131, the "private key for an identifier" generated in S11, the "chunk of the file (state A) before update" generated in S132, and the random number used for generation of the file identifier of the file before update corresponding to the chunk together to an algorithm, and generates a new random number for outputting the same file identifier to each new provisional chunk generated in S131 (S133).

The generated random number is a random number that is used for generation of the file identifier of a file after update.

(4a) The file use unit 11 records the random number generated in S133 on the metadata file, additionally records an editor public key on the metadata file, applies an electronic signature to the random number and the editor public key, also records the electronic signature on the metadata file, and generates a new upper folder in which the folder and the metadata file are stored to update and output the provisional chunk (S134).

(5a) The file use unit 11 generates a file in which the folder generated in S134 is compressed or archived for each of the provisional chunks, and generates a file converted into a DAG on the basis of each file (S135).

<File Association Verification: Normal Storage>

Figure 10:
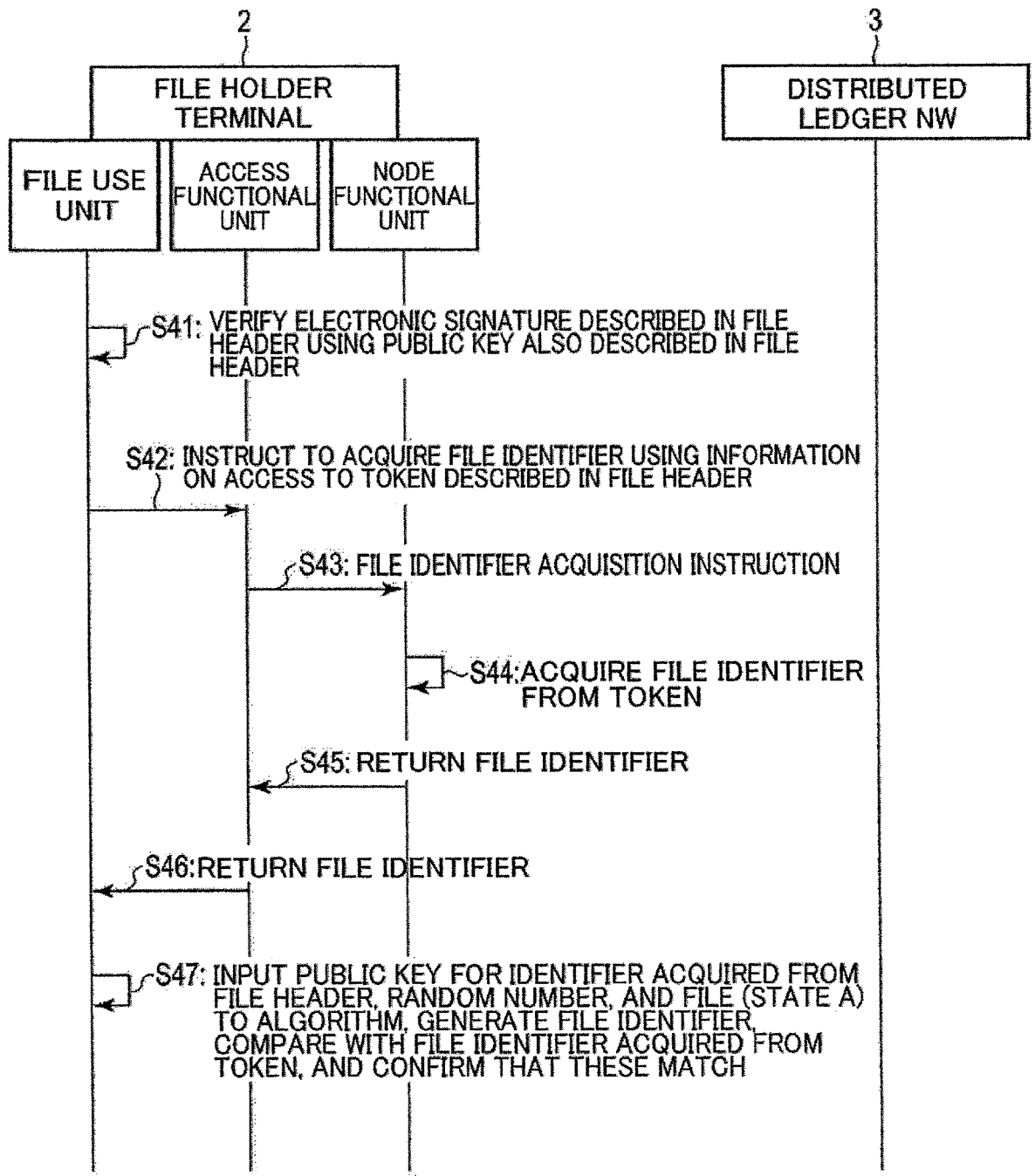
FIG. 10 is a diagram illustrating a sequence for describing an example of the file association verification processing for a normal storage.

Next, file association verification processing with respect to a normal storage in the management system according to the present embodiment will be described. This association verification processing is processing for verifying the association between the token managed by the distributed ledger network 3 and the file having the information on access to the token managed by the file holder terminal 2 by confirming whether or not the identifier related to the updated file matches the identifier related to the file before update that is created before the update. FIG. 10 is a diagram illustrating a sequence for describing an example of the file association verification processing for a normal storage.

(1) The file use unit 21 of the file holder terminal 2 verifies the electronic signature described in the file header of the processing target file after update with the editor public key described in the same file header (S41).

(2) The file use unit 21 instructs the access functional unit 22 to acquire the file identifier in the token managed in the distributed ledger network 3 by using the "the information on access to the token" described in the file header of the processing target file (S42). In response to the instruction, the access functional unit 22 instructs the node functional unit 23 to acquire the file identifier (S43).

In response to the instruction, the node functional unit 23 accesses the distributed ledger network 3 via the communication unit 24 to acquire the file identifier from the token related to "the information on access to the token" managed in the distributed ledger (S44), and returns the file identifier to the access functional unit 22 (S45). The access functional unit 22 returns the file identifier to the file use unit 21 (S46).

(3) The file use unit 21 acquires the public key for an identifier and the random number from the header of the file after update, and inputs the acquired public key for an identifier and the acquired random number, and the file after update (state A) to the algorithm to generate the file identifier for comparison.

The file use unit 21 compares the file identifier for comparison with the file identifier acquired from the token by S42 to S46, and confirms that these match each other (S47).

Thus, when the information on access to the token is held in the file header, association with the token is verified. When a plurality of pieces of "the information on access to the token" are held in the file header, the association between the identifier of the processing target file and the file identifiers in the plurality of tokens is verified.

When the processing target file is a file which is stored in a folder together with the access information file and archived or compressed, (1) to (3) in the association verification processing can be replaced with (1a) to (3a) below.

(1a) The file use unit 21 of the file holder terminal 2 restores the file in which a folder storing a file after update that is a processing target file is archived or compressed to an original folder, and verifies the electronic signature recorded in the metadata file stored in the folder using the editor public key recorded in the same metadata file (S41).

(2a) The file use unit 21 instructs the access functional unit 22 to acquire the file identifier in the token managed in the distributed ledger network 3 by using "information on access to a token" recorded in the access information file stored in a lower folder stored in the restored folder (S42). In response to the instruction, the access functional unit 22 instructs the node functional unit 23 to acquire the file identifier (S43).

In response to the instruction, the node functional unit 23 accesses the distributed ledger network 3 via the communication unit 24 to acquire the file identifier from the token related to "the information on access to the token" managed in the distributed ledger (S44), and returns the file identifier to the access functional unit 22 (S45). The access functional unit 22 returns the file identifier to the file use unit 21 (S46).

(3a) The file use unit 21 acquires the public key for an identifier from the access information file stored in the lower folder, and acquires the random number from the metadata file stored in the restored folder. The file use unit 21 inputs the acquired public key for an identifier and the acquired random number, the folder, and the folder in which the file after update (state A) in this case and the access information file are stored to an algorithm to generate the file identifier for comparison.

The file use unit 21 compares the file identifier for comparison with the file identifier acquired from the token by S42 to S46, and confirms that these match each other (S47).

<File (Chunk) Association Verification: Storage in which File is Converted into a DAG>

Figure 11:
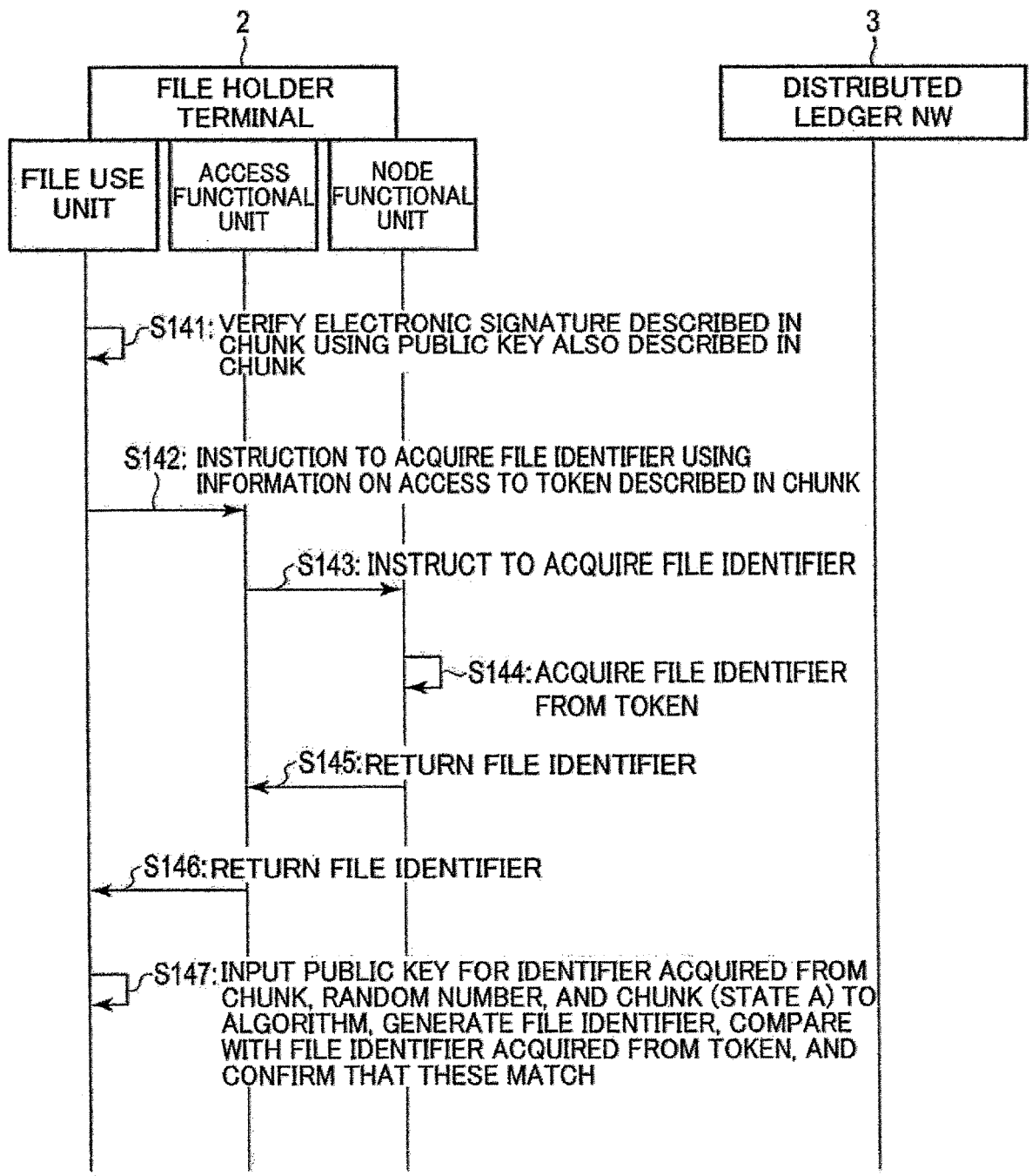
FIG. 11 is a diagram illustrating a sequence for describing an example of file association verification processing for a storage in which a file is converted into a DAG.

Next, file association verification processing with respect to a storage in which a file is converted into a DAG in the management system according to the present embodiment will be described. FIG. 11 is a diagram illustrating a sequence for describing an example of file association verification processing for a storage in which a file is converted into a DAG.

(1) The file use unit 21 of the file holder terminal 2 verifies the electronic signature described in the chunk of the file before update which is a processing target using the editor public key described in the same chunk (S141).

(2) The file use unit 21 instructs the access functional unit 22 to acquire the file identifier by using "the information on access to the token" described in the chunk of the processing target file (S142). In response to the instruction, the access functional unit 22 instructs the node functional unit 23 to acquire the file identifier (S143).

In response to the instruction, the node functional unit 23 accesses the distributed ledger network 3 via the communication unit 24 to acquire the file identifier from the token related to "the information on access to the token" managed in the distributed ledger (S144), and returns the file identifier to the access functional unit 22 (S145). The access functional unit 22 returns the file identifier to the file use unit 21 (S146).

(3) The file use unit 21 acquires the public key for an identifier and the random number from the chunk of the file after update, and inputs the acquired public key for an identifier and the acquired random number, and the chunk (state A) of the file after update to the algorithm to generate the file identifier for comparison.

The file use unit 21 compares the file identifier for comparison with the file identifier acquired from the token by S142 to S146, and confirms that these match each other (S147).

Thus, when the information on access to the token is held in the chunk, association with the token is verified. When a plurality of pieces of "the information on access to the token" are held in the chunk, the association between the identifier of the chunk of the processing target file and the identifiers in the plurality of tokens is verified.

When the chunk of the file that is a processing target is a chunk that is stored in the folder together with the access information file and is archived or compressed, (1) to (3) above in the association verification processing can be replaced with (1a) to (3a) below.

(1a) The file use unit 21 of the file holder terminal 2 restores the file in which a folder storing the chunk of the file before update which is a processing target file is archived or compressed to an original folder, and verifies the electronic signature recorded in the metadata file stored in the folder using the editor public key recorded in the same metadata file (S141).

(2a) The file use unit 21 instructs the access functional unit 22 to acquire the file identifier by using the "information on access to a token" recorded in the access information file stored in the lower folder stored in the restored folder (S142). In response to the instruction, the access functional unit 22 instructs the node functional unit 23 to acquire the file identifier (S143).

In response to the instruction, the node functional unit 23 accesses the distributed ledger network 3 via the communication unit 24 to acquire the file identifier from the token related to "the information on access to the token" managed in the distributed ledger (S144), and returns the file identifier to the access functional unit 22 (S145). The access functional unit 22 returns the file identifier to the file use unit 21 (S146).

(3a) The file use unit 21 acquires the public key for an identifier from the access information file stored in the lower folder, and acquires the random number from the metadata file stored in the restored folder. The file use unit 21 inputs the acquired public key for an identifier and the acquired random number, the folder, and the folder in which the chunk (state A) of the file after update in this case and the access information file are stored to an algorithm and generates the file identifier for comparison.

The file use unit 21 compares the file identifier for comparison with the file identifier acquired from the token by S142 to S146, and confirms that these match each other (S147).

In the present embodiment, because, even in a normal storage or a storage in which a file is converted into a DAG, the file header or each chunk includes the public key for an identifier and the random number, and the same file identifier can be generated, the association verification can be performed regardless of a type of the storage.

As described above, in the management system according to the first embodiment of the present invention, because the information on access to the token, the public key for an identifier, and the random number on the distributed ledger are set in the processing target file, and the identifier of the file is included in the token, it is possible to confirm association with the management information when the file is edited by a regular user.

Second Embodiment

Next, a second embodiment of the present invention will be described.

An application example of a management system according to the second embodiment of the present invention, a functional configuration of a file registration terminal 1, and a functional configuration of a file holder terminal 2 are the same as those illustrated in FIGS. 1 to 3.

Figure 12:
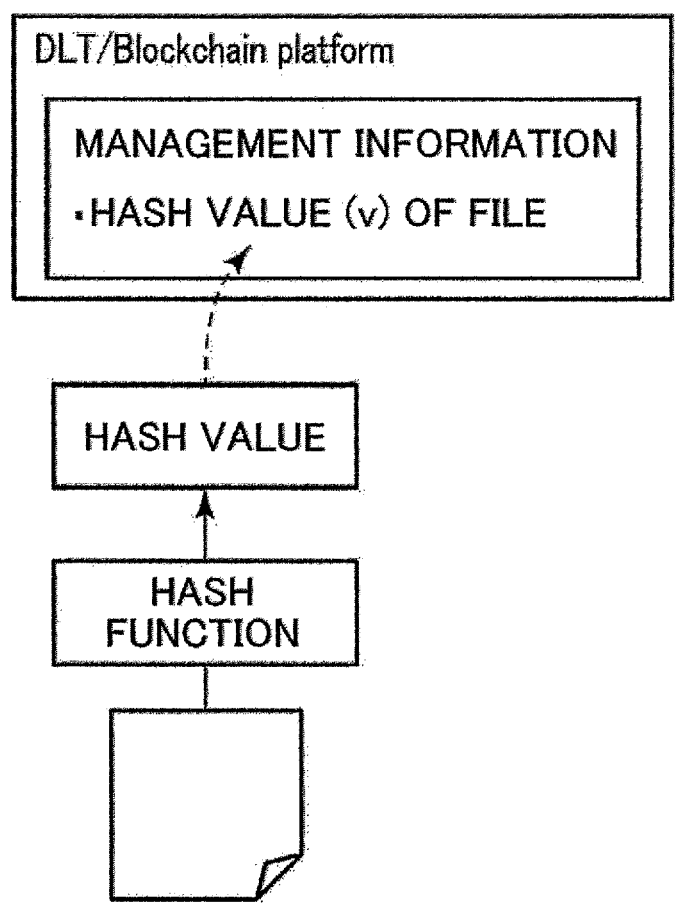
FIG. 12 is a diagram illustrating an example of identification information used for association with general management information managed in a distributed ledger.

FIG. 12 is a diagram illustrating an example of identification information used for association with general management information managed in a distributed ledger.

In the example illustrated in FIG. 12, management information is managed in a distributed ledger by a distributed ledger technology or the blockchain, and a hash value (V) obtained by applying a hash function to a processing target file in the management information is used as identification information (ID) used for association with the management information managed in the distributed ledger.

Figure 13:
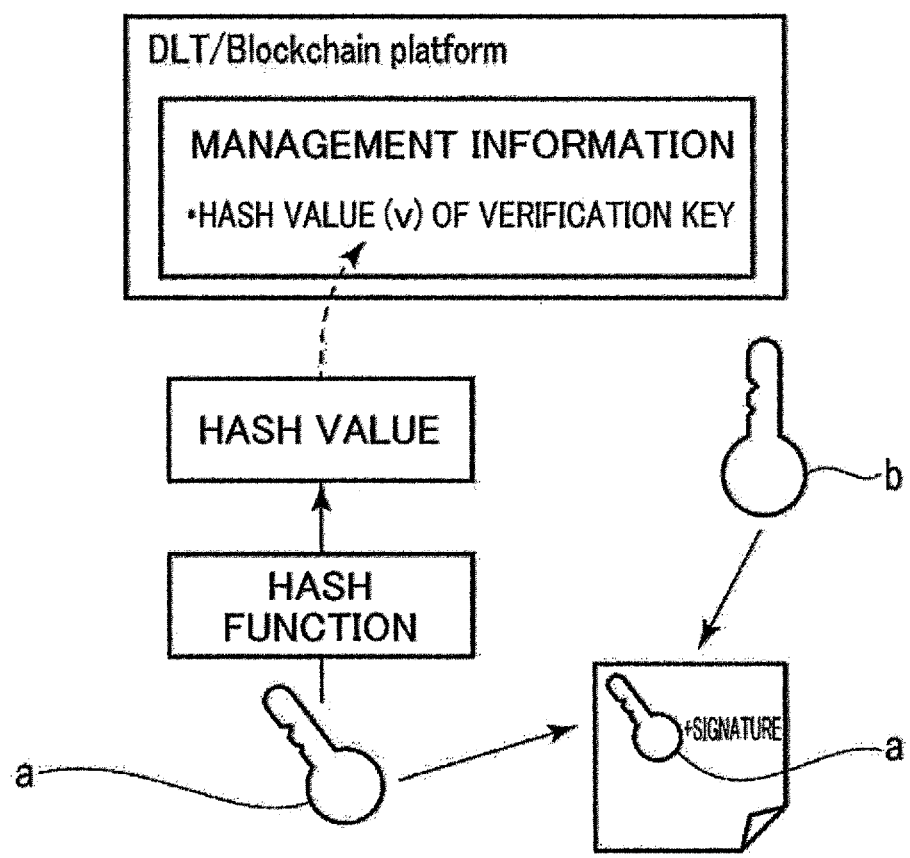
FIG. 13 is a diagram illustrating an example of identification information used for association with management information managed in a distributed ledger used in the second embodiment of the present invention.

FIG. 13 is a diagram illustrating an example of identification information used for association with management information managed in a distributed ledger used in the second embodiment of the present invention.

In the second embodiment of the present invention, as the first pattern (referred to as pattern 1), (1) an electronic signature and (2) a verification key of the electron signature are recorded on the processing target file, as in the example shown in FIG. 13. The verification key is a public key and is also referred to as a signature verification key. Information on access to the management information can also be recorded in the file.

The verification key is indicated by a symbol a in FIG. 13, and the signature key used for generation of the electronic signature is indicated by a symbol b in FIG. 13. The signature key is a private key and is also referred to as a signature generation key.

In this example, a hash value (v) obtained by applying a hash function to a verification key of an electronic signature of the processing target file can be used as an ID used for association of the processing target file with management information managed in the distributed ledger.

Further, in the present embodiment, as a second pattern (pattern 2), a hash value of a verification key of an electronic signature and an arbitrary management ID can be used as an ID used for association with the management information managed in the distributed ledger.

In the second pattern, (1) an electronic signature, (2) a verification key for the electronic signature, and (3) an arbitrary management ID are recorded on the processing target. The information on access to the management information can also be recorded in the file.

In this example, a hash value (v) obtained by applying a hash function to the verification key of the electronic signature of the processing target file and the arbitrary management ID can be used as an ID used for association of the processing target file with the management information managed in the distributed ledger.

Figure 14:
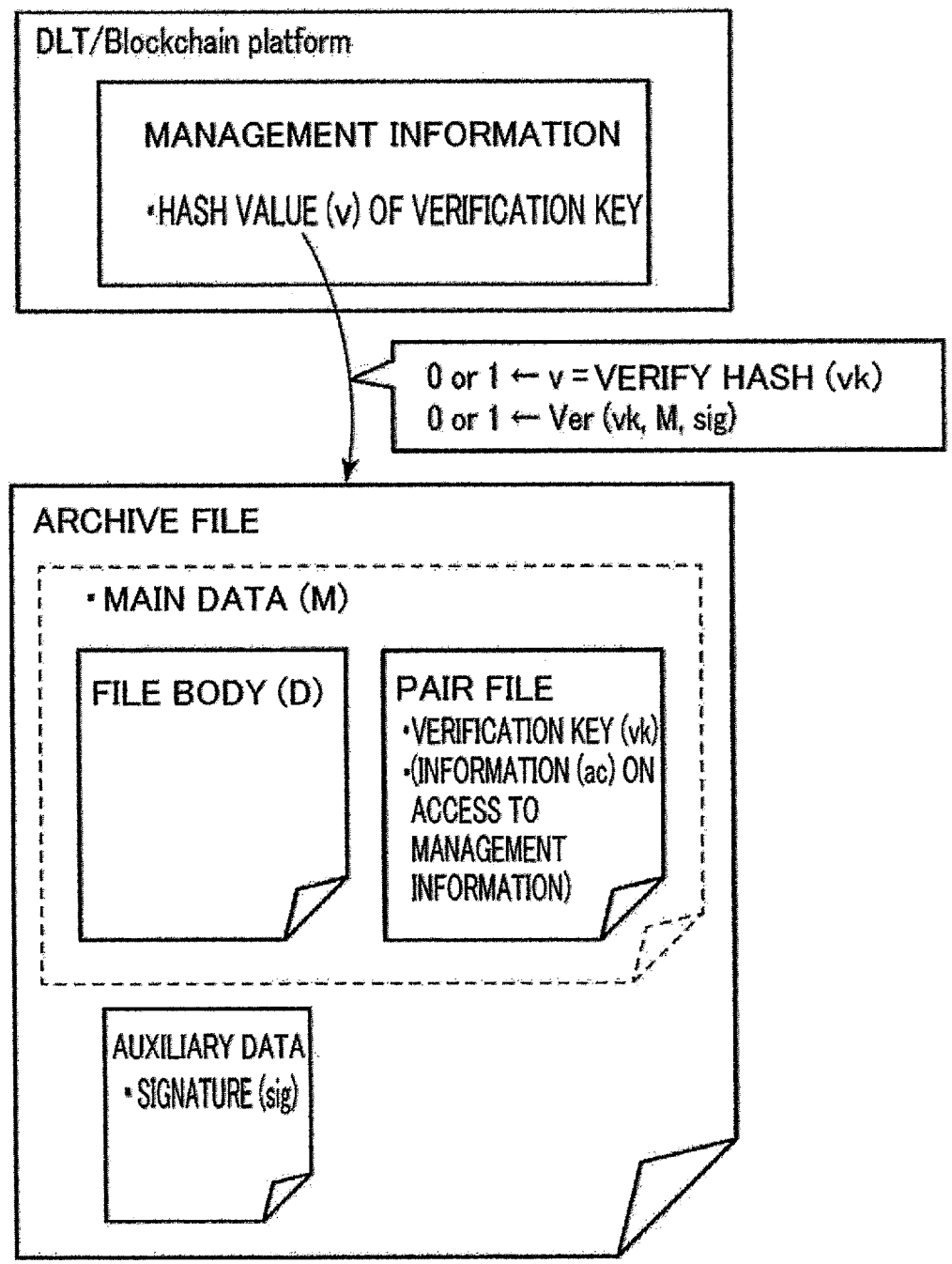
FIG. 14 is a diagram illustrating a first example of a configuration of a processing target file used in the second embodiment of the present invention.

FIG. 14 is a diagram illustrating a first example of a configuration of a processing target file used in the second embodiment of the present invention.

In the example illustrated in FIG. 14, there is shown an example of a configuration of the processing target file which is applied to the pattern 1. In this example, the processing target file may be configured as one file archived, including main data (M) and auxiliary data. Further, the processing target file may also be configured as one file compressed, including the main data (M) and the auxiliary data.

The main data (M) includes the file body (D) and the pair file. The pair file is a file provided as a pair of file bodies (D), and include a verification key (vk) of an electronic signature (sig) of the processing target file, that is, the main data (M). The pair file may include information (ac) on access to the management information.

The auxiliary data includes an electronic signature (sig) of the processing target file. The electronic signature is generated by applying a signature key (sk) to the main data (M) and encoding the main data (M) as shown in Equation (1) below.

$$sig = \text{Sign}(sk, M) \qquad \text{Equation (1)}$$

One file containing the verification key and the electronic signature is generated by the archive or compression.

In the association verification to be described below, the electronic signature (sig) is verified by the verification key (vk) in the pair file.

Further, in the association verification, a hash value (hash (vk)) of a verification key (vk) in the pair file is compared with a hash value (v) of a verification key in the management information in the distributed ledger, and it is confirmed whether or not both match each other.

As in the example illustrated in FIG. 12, because it is necessary to generate an identifier for each file when a hash value of the processing target file is used as an identifier for associating the file with the management ledger, it is difficult to perform management in a file group consisting of a plurality of files.

Therefore, as in the pattern 1 illustrated in FIG. 13, it is possible to perform the management in the file group by using the hash value of the verification key as the identifier for associating the file with the management ledger and performing the association between the identifier and the file using an electronic signature.

Figure 15:
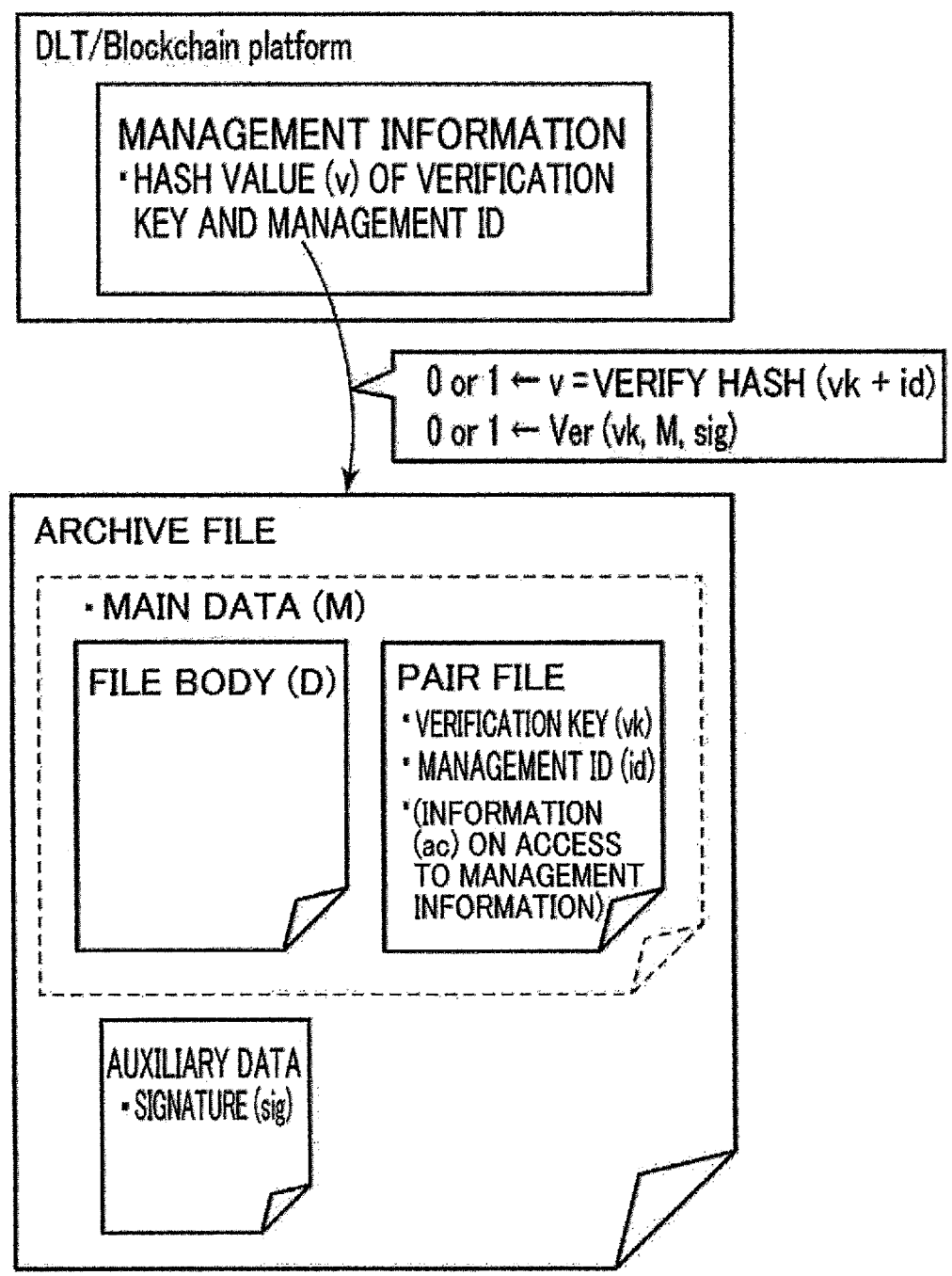
FIG. 15 is a diagram illustrating a second example of the configuration of the processing target file used in the second embodiment of the present invention.

FIG. 15 is a diagram illustrating a second example of the configuration of the processing target file used in the second embodiment of the present invention.

In the example illustrated in FIG. 15, there is shown an example of a configuration of the processing target file which is applied to the pattern 2. In this example, the processing target file may be configured as one file archived, including main data (M) and auxiliary data. Further, the processing target file may also be configured as one file compressed, including the main data (M) and the auxiliary data.

The main data (M) includes a file body (D) and a pair file. The pair file includes a verification key (vk) of the electronic signature and a management ID (id). The pair file may include information (ac) on access to the management information.

The auxiliary data includes an electronic signature (sig) of the processing target file, that is, the main data (M). The electronic signature is generated by applying a signature key (sk) to the main data (M) and encoding the main data (M) as illustrated in Equation (1) above.

In the association verification to be described below, the electronic signature (sig) is verified by the verification key (vk) in the pair file.

Further, in the association verification, a hash value (hash (vk+id)) of "the verification key (vk) and the management ID [id] in the pair file" is compared with a hash value (v) of the "verification key and the management ID" in the management information in the distributed ledger, and it is confirmed whether or not both match each other.

As in the pattern 2, the hash value of the verification key and an arbitrary management ID generated for each file group consisting of a plurality of processing target files is used as an identifier for linking the file and the management ledger, and the link between the identifier and the file is performed by using an electronic signature, so that it becomes possible to easily perform management of a file group.

In the pattern 2, by using the hash value of the verification key and the arbitrary management ID as the identifier instead of the hash value of only the verification key described in the pattern 1, it is possible to divide and manage the data group by using the management ID for each file group even when the same pair of the verification key and the signature key is created for a plurality of file groups and the archive file is generated. That is, because it is not necessary to prepare a pair consisting of the verification key and the signature key for each file group, management is facilitated.

<File Registration: Pattern 1>

Next, the file registration processing according to the pattern 1 in the management system according to the present embodiment will be described. The file registration processing related to the pattern 1 is processing for registering the hash value of the verification key related to the processing target file in the management information on the distributed ledger network.

Figure 16:
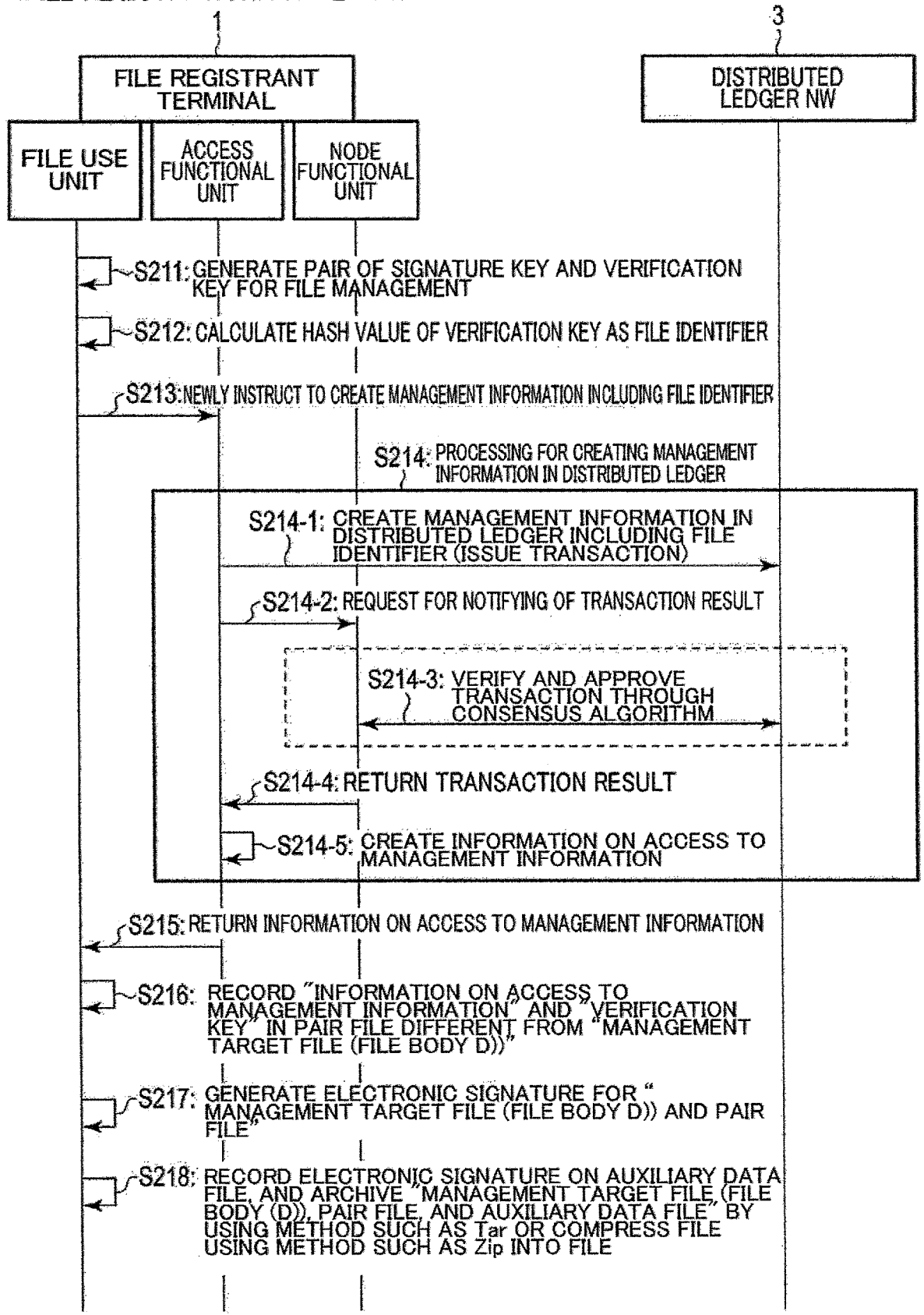
FIG. 16 is a diagram illustrating a sequence for explaining a first example of file registration processing.

FIG. 16 is a diagram illustrating a sequence for explaining a first example of file registration processing.

(1) The file use unit 11 of the file registration terminal 1 generates a pair of a signature key and a verification key for management of a processing target file, which are stored in the file management DB 11a (S211).

The file use unit 11 calculates a hash value of the verification key generated in S211 as an identifier of the processing target file (file identifier) (S212).

(2) The file use unit 11 of the file registration terminal 1 instructs the access functional unit 12 to newly create management information including the file identifier with respect to the distributed ledger (S213). In response to the instruction, the access functional unit 12 performs management information generation processing with respect to the distributed ledger (S214).

Specifically, the access functional unit 12 creates a transaction for generating management information to the distributed ledger as information including the hash value of the verification key generated in S211 as the file identifier, and broadcasts the transaction to the distributed ledger network 3 via the communication unit 14 of the file registration terminal 1 (S214-1). The access functional unit 12 sends a notification request of a transaction result to the node functional unit 13 (S214-2).

Next, in response to a request from the node functional unit 13, the transaction is verified by a consensus algorithm in the distributed ledger network 3. When the transaction satisfies a predetermined requirement, the transaction is approved (S214-3).

When the node functional unit 13 receives the result of the transaction from the distributed ledger network 3 through the communication unit 14, the node functional unit 13 returns the result to the access functional unit 12 (S214-4). In response to the result, the access functional unit 12 creates "the information on access to the management information" for the processing target file (S214-5). Processing of S214 is performed by S214-1 to S214-5.

The access functional unit 12 returns the created "the information on access to the management information" to the file use unit 11 (S215).

(3) The file use unit 11 records the "the information on access to the management information" returned in S215 and the "verification key" generated in S211 on a pair file which is a file different from a "management target file (file body (D))" (S216).

(4) The file use unit 11 generates an electronic signature for the "management target file (file body (D)) and the pair file" using the signature key generated in S211 (S217).

(5) The file use unit 11 records the electronic signature generated in S217 on the file of the auxiliary data, and converts "the management target file (file body (D)), the pair file, and the auxiliary data file" into an archive file in a format such as Tar or a compressed file in a format such as Zip (S218).

<File Registration: Pattern 2>

Next, the file registration processing according to the pattern 2 in the management system according to the present embodiment will be described. The file registration processing related to the pattern 2 is processing for registering a hash value of a verification key and a management ID related to the processing target file in the management information on the distributed ledger network.

Figure 17:
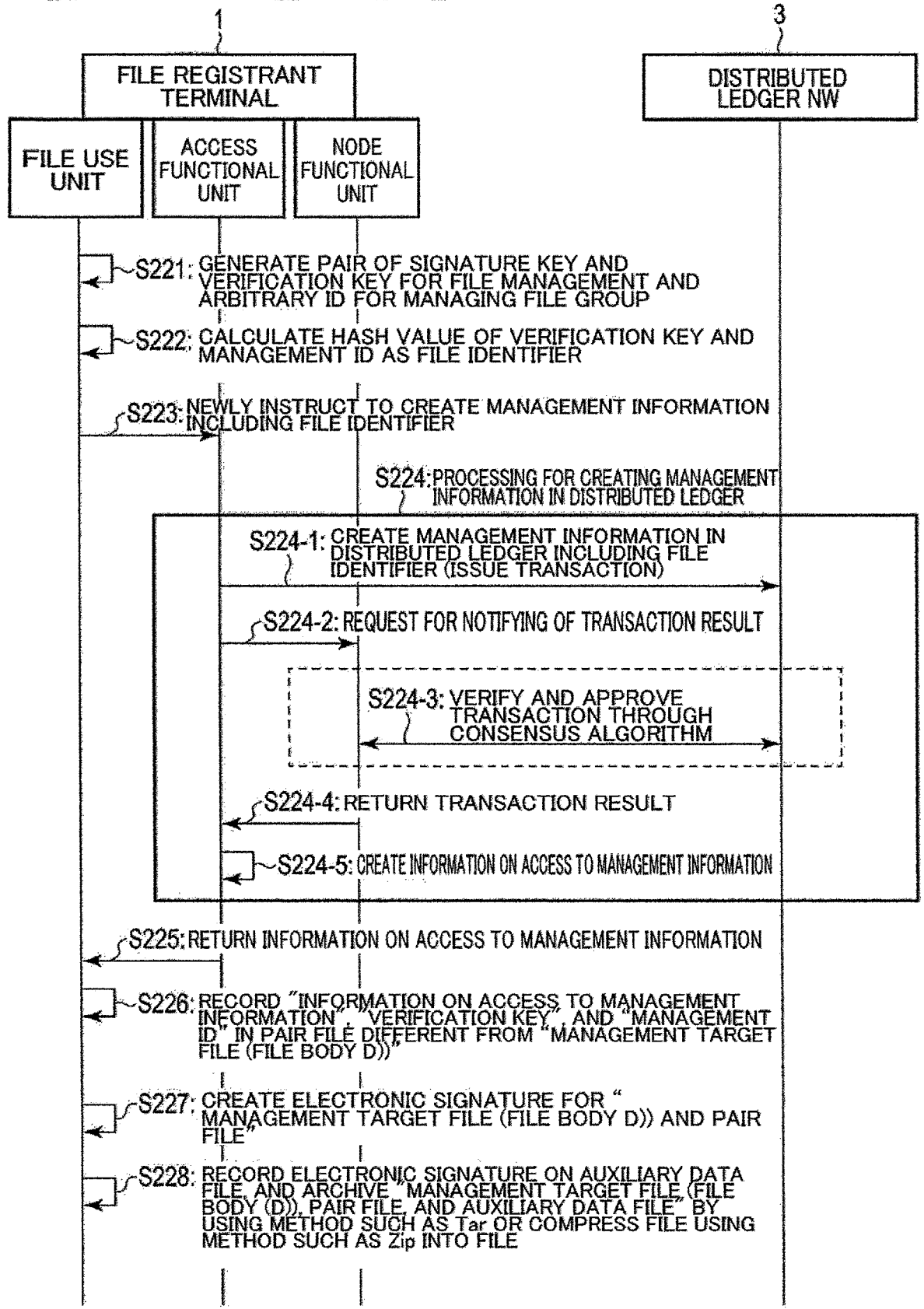
FIG. 17 is a diagram illustrating a sequence for explaining a second example of the file registration processing.

FIG. 17 is a diagram illustrating a sequence for explaining a second example of the file registration processing.

(1) First, the file use unit 11 of the file registration terminal 1 generates a pair of a signature key and a verification key for management of the processing target file, which is stored in the file management DB 11a, and an arbitrary management ID for managing a processing target file group (S221).

The file use unit 11 calculates a hash value between the verification key generated in S221 and the management ID as the identifier of the processing target file (S222).

(2) The file use unit 11 of the file registration terminal 1 instructs the access functional unit 12 to newly create management information including the file identifier with respect to the distributed ledger (S223). In response to the instruction, the access functional unit 12 performs management information generation processing with respect to the distributed ledger (S224).

Specifically, the access functional unit 12 creates a transaction for generating management information to the distributed ledger as information including the hash value of "the verification key and the management ID" generated in S221 as the file identifier, and broadcasts the transaction to the distributed ledger network 3 via the communication unit 14 (S224-1). The access functional unit 12 sends a notification request of a transaction result to the node functional unit 13 (S224-2).

Next, in response to a request from the node functional unit 13, the transaction is verified by a consensus algorithm in the distributed ledger network 3. When the transaction satisfies a predetermined requirement, the transaction is approved (S224-3).

When the node functional unit 13 receives the result of the transaction from the distributed ledger network 3 through the communication unit 14, the node functional unit 13 returns the result to the access functional unit 12 (S224-4). In response to the result, the access functional unit 12 creates "the information on access to the management information" for the processing target file (S224-5). The processing of S224 is thus completed.

The access functional unit 12 returns the created "the information on access to the management information" to the file use unit 11 (S225).

(3) The file use unit 11 records the "the information on access to the management information" returned in S225 and the "verification key" generated in S221 on a pair file which is a file different from "a management target file (file body (D))" (S226).

(4) The file use unit 11 generates an electronic signature for the "management target file (file body (D)) and the pair file" using the signature key generated in S211 (S227).

(5) The file use unit 11 records the electronic signature generated in S227 on the file of the auxiliary data, and converts "the management target file (file body (D)), the pair file, and the auxiliary data file" into an archive file in a format such as Tar or a compressed file in a format such as Zip (S228).

<File Update: Patterns 1 and 2>

Figure 18:
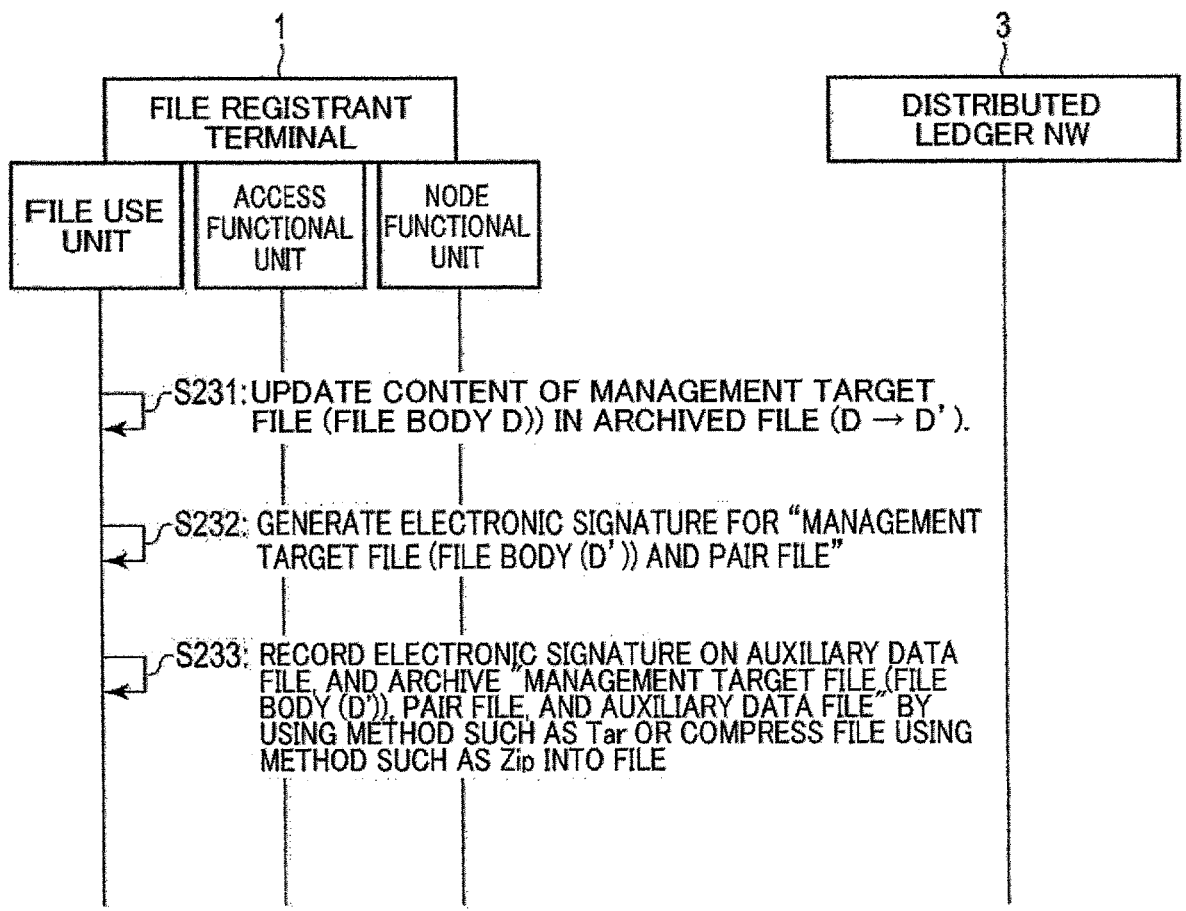
FIG. 18 is a diagram illustrating a sequence describing an example of file update processing.

Next, the file update processing in the normal storage in the management system according to the present embodiment will be described. The updating processing described here is processing that is common to the patterns 1 and 2. FIG. 18 is a diagram illustrating a sequence describing an example of file update processing.

(1) The file use unit 11 of the file registration terminal 1 returns the file archived or compressed by the registration processing to the original management target file (file body (D)), the pair file, and the auxiliary data and updates content of the management target file (file body (D)) among these (S231). A notation of the file body after update is a "file body (D')".

(2) The file use unit 11 generates an electronic signature for "the management target file (file body (D')) and the pair file" returned in S231 using the separately generated signature key (S232).

(3) The file use unit 11 records the electronic signature on the file of the auxiliary data returned in S231, and converts "the management target file (file body (D')), the pair file, and the auxiliary data file" into an archive file in a format such as Tar or a compressed file in a format such as Zip (S233).

Because the file identifier is not updated in the update processing, it is not necessary to update the file identifier of the management information on the distributed ledger.

<File Association Verification: Pattern 1>

Figure 19:
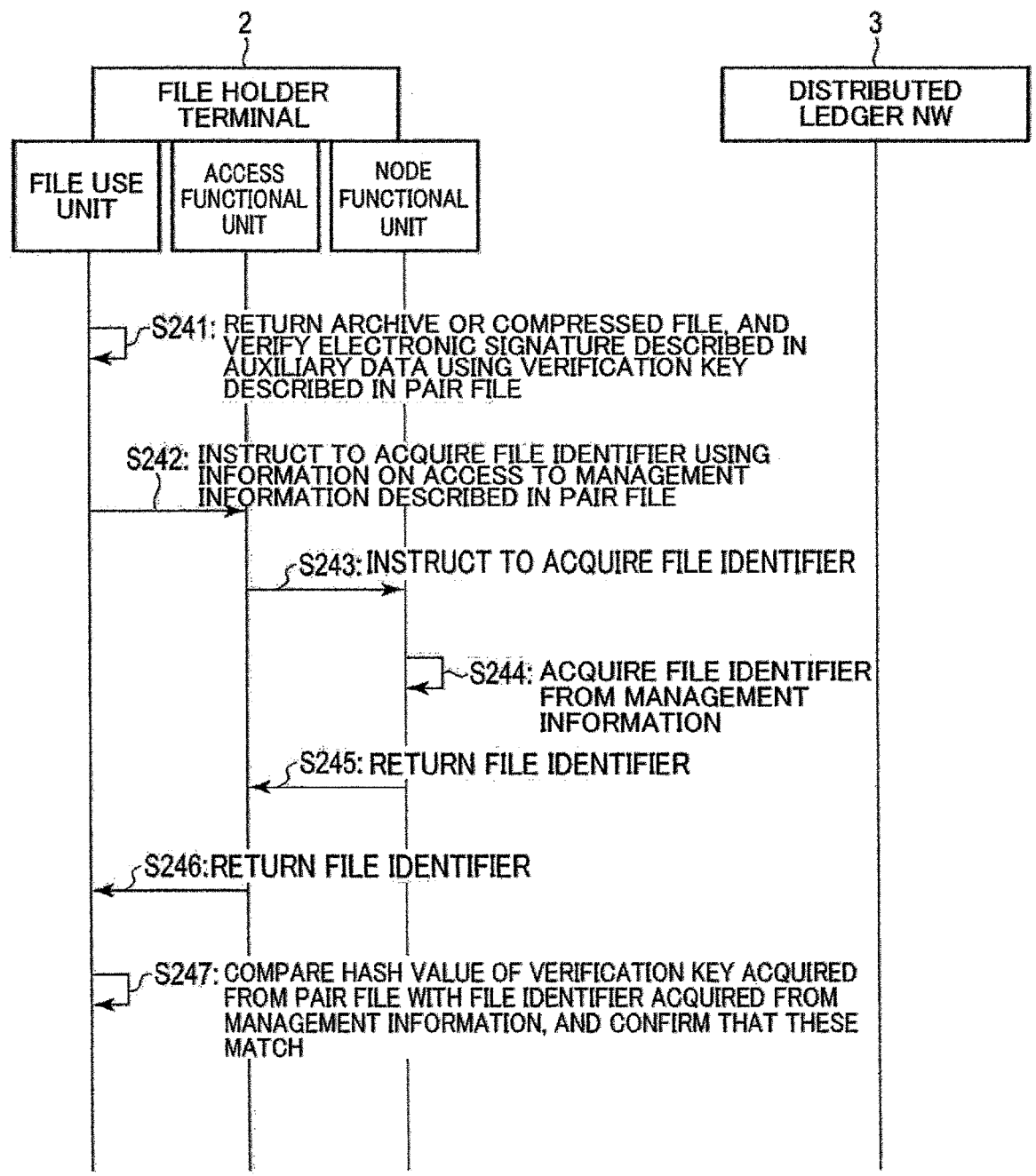
FIG. 19 is a diagram illustrating a sequence for describing a first example of the file association verification processing.

Next, the file association verification processing according to the pattern 1 in the management system according to the present embodiment will be described. This association verification processing is processing for verifying association between an identifier related to a processing target file and the file identifier managed in the distributed ledger network. FIG. 19 is a diagram illustrating a sequence for describing a first example of the file association verification processing.

(1) The file use unit 21 of the file holder terminal 2 returns the archive file or the compressed file to the original file body, the pair file, and the auxiliary data, and verifies the electronic signature described in the returned auxiliary data with the verification key described in the returned pair file (S241).

(2) The file use unit 21 instructs the access functional unit 22 to acquire the file identifier in the management information managed in the distributed ledger network 3 by using "the information on access to the management information" described in the returned pair file (S242). In response to the instruction, the access functional unit 22 instructs the node functional unit 23 to acquire the file identifier (S243).

In response to the instruction, the node functional unit 23 accesses the distributed ledger network 3 via the communication unit 24 to acquire the file identifier from the management information related to the "the information on access to the management information" managed in the distributed ledger (S244), and returns the file identifier to the access functional unit 22 (S245). The access functional unit 22 returns the file identifier to the file use unit 21 (S246).

(3) The file use unit 21 generates a hash value of the verification key obtained from the returned pair file as the identifier of the processing target file, compares the hash value with the file identifier acquired from the management information, and confirms that these match each other (S247).

<File Association Verification: Pattern 2>

Figure 20:
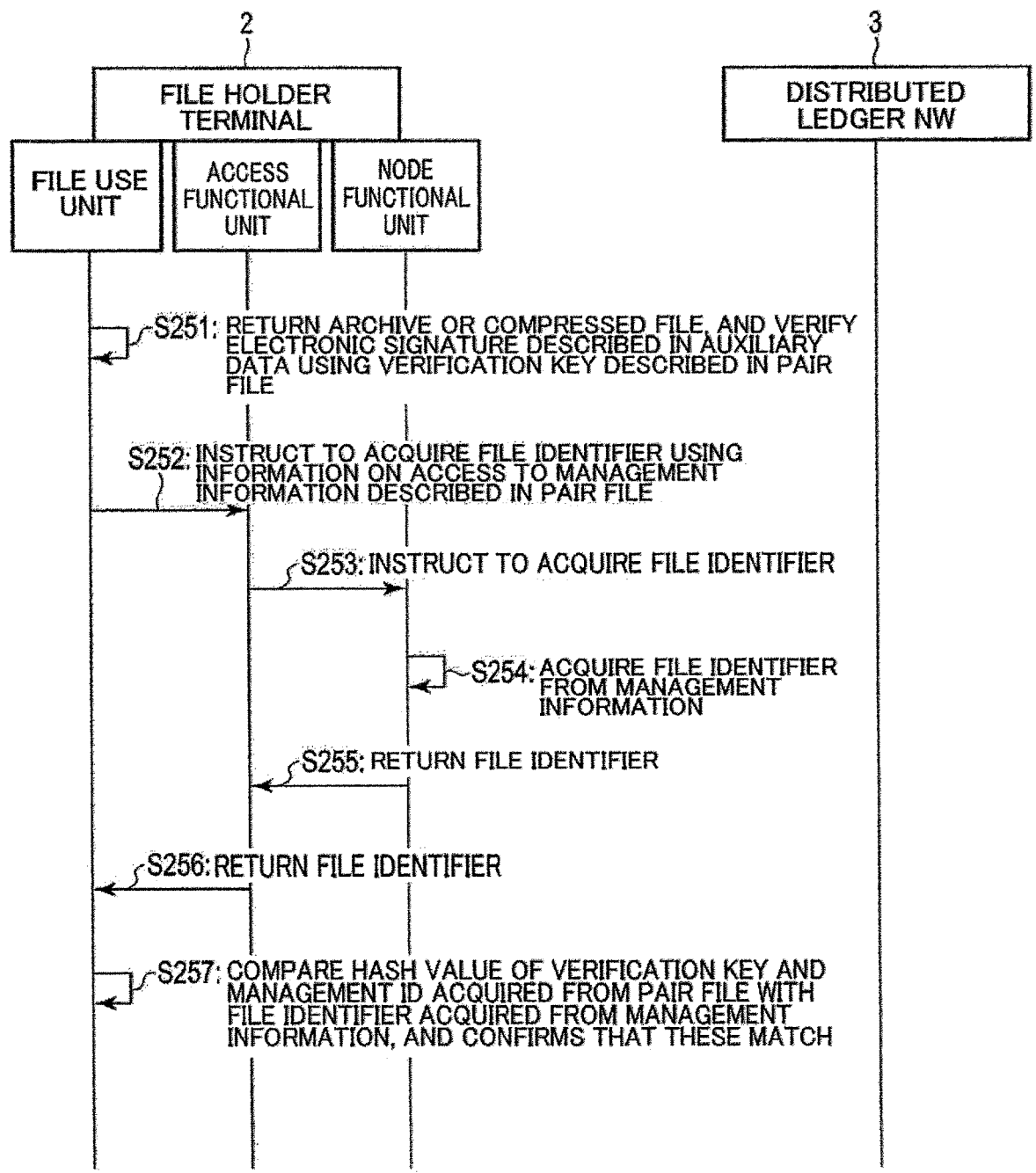
FIG. 20 is a diagram illustrating a sequence for describing a second example of the file association verification processing.

Next, the file association verification processing according to the pattern 2 in the management system according to the present embodiment will be described. FIG. 20 is a diagram illustrating a sequence for describing a second example of the file association verification processing.

(1) The file use unit 21 of the file holder terminal 2 returns the archive file or the compressed file to the original file body, the pair file, and the auxiliary data, and verifies the electronic signature described in the returned auxiliary data with the verification key described in the returned pair file (S251).

(2) The file use unit 21 instructs the access functional unit 22 to acquire the file identifier in the management information managed in the distributed ledger network 3 by using "the information on access to the management information" described in the returned pair file (S252). In response to the instruction, the access functional unit 22 instructs the node functional unit 23 to acquire the file identifier (S253).

In response to the instruction, the node functional unit 23 accesses the distributed ledger network 3 via the communication unit 24 to acquire the file identifier from the management information related to the "the information on access to the management information" managed in the distributed ledger (S254), and returns the file identifier to the access functional unit 22 (S255). The access functional unit 22 returns the file identifier to the file use unit 21 (S256).

(3) The file use unit 21 generates a hash value of "verification key and management ID" acquired from the returned pair file as the identifier of the processing target file, compares the hash value with the file identifier acquired from the management information, and confirms that these match each other (S248).

As described above, in the management system according to the second embodiment of the present invention, because the verification key of the electronic signature and the information on access to the management information on the distributed ledger are recorded on the processing target file, and the hash value of the verification key is recorded on the management information as the identifier of the file, the association between the file identifier and the processing target file is made by an electronic signature. This makes it possible confirm the association with the management information when the file is edited by a regular user, for a file group consisting of a plurality of files.

Figure 21:
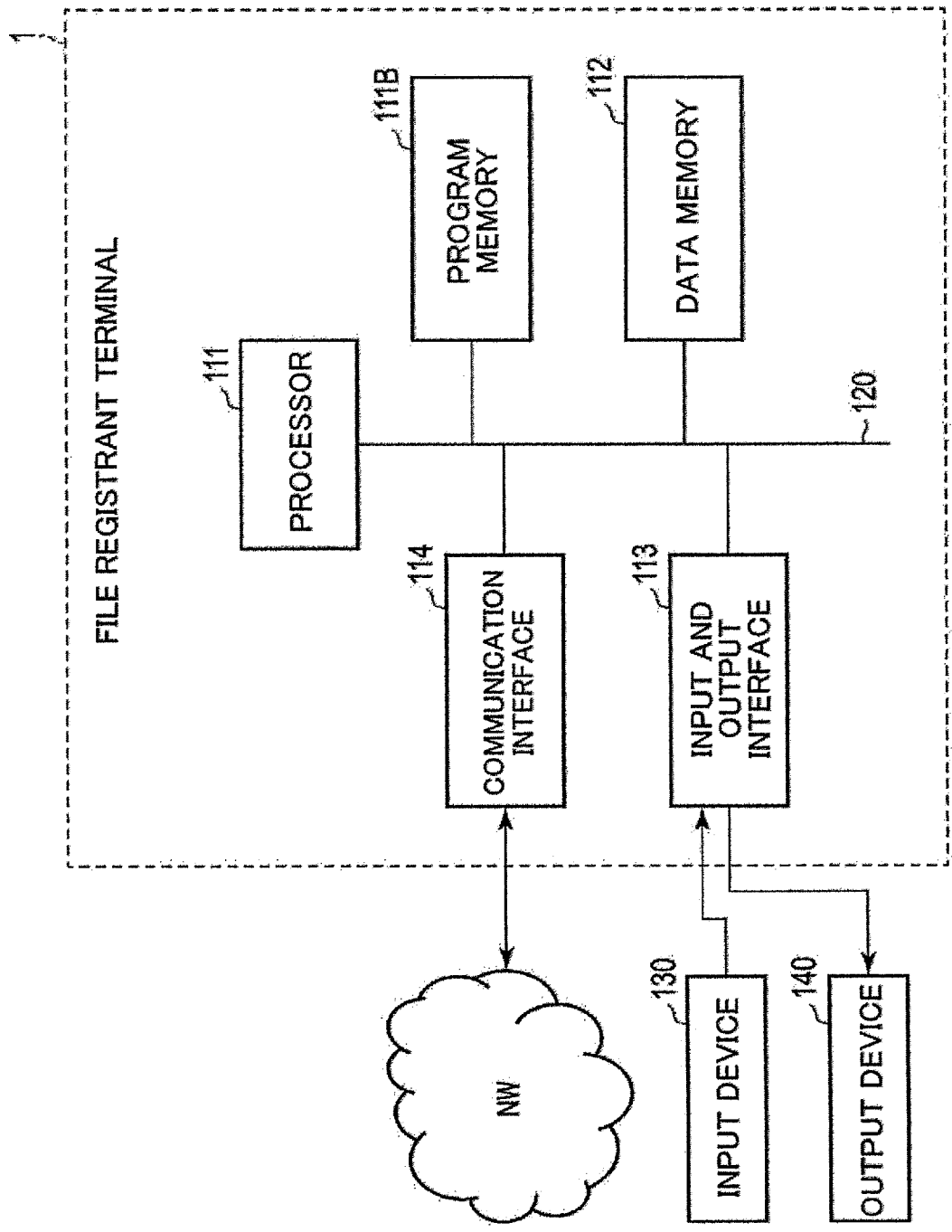
FIG. 21 is a block diagram illustrating an example of a hardware configuration of a file registration terminal.

FIG. 21 is a block diagram illustrating an example of a hardware configuration of the file registration terminal according to an embodiment of the present invention. In the example illustrated in FIG. 1, the file registration terminal 1 is configured of, for example, a server computer or a personal computer, and includes a hardware processor 111, such as a central processing unit (CPU). A program memory 111B, a data memory 112, an input and output interface 113, and a communication interface 114 are connected to the hardware processor 111 via a bus 120. The same applies to the file holder terminal 2.

The communication interface 114 includes, for example, one or more wireless communication interface units, and enables information to be transmitted and received to and from the communication network NW. As the wireless interface, an interface adopting a low power wireless data communication standard such as a wireless Local Area Network (LAN) can be used.

An input device 130 for an operator and an output device 140 attached to the file registration terminal 1 are connected to the input and output interface 113. The input and output interface 113 performs processing for capturing operation data input by an operator through the input device 130 such as a keyboard, a touch panel, a touchpad, and a mouse, and outputting output data to the output device 140 including a display device using a liquid crystal, an organic electroluminescence (EL), or the like so that the data is displayed. As the input device 130 and the output device 140, a device built in the file registration terminal 1 may be used, and an input device and an output device of another information terminal capable of communicating with the file registration terminal 1 via the communication network NW may be used.

The program memory 111B is a non-transitory tangible storage medium, and is, for example, a combination of a non-volatile memory such as a Hard Disk Drive (HDD) or a Solid State Drive (SSD) that can be written and read at any time, and a non-volatile memory such as a Read Only Memory (ROM), and can store programs necessary for executing various processing according to one embodiment.

The data memory 112 is a tangible storage medium, and is, for example, a combination of the non-volatile memory and a volatile memory such as a random access memory (RAM), and can be used to store various types of data acquired and created when various processing are performed.

The file registration terminal 1 according to an embodiment of the present invention can be configured as a data processing device including the file use unit 11, the access functional unit 12, the node functional unit 13, and the communication unit 14 illustrated in FIG. 2 as processing functional units that are realized by software. Similarly, the file holder terminal 2 according to the embodiment of the present invention can be configured as a data processing device including the file use unit 21, the access functional unit 22, the node functional unit 23, and the communication unit 24 illustrated in FIG. 3 as processing functional units by software.

Further, the various databases illustrated in FIGS. 2 and 3 may be configured using the data memory 112 illustrated in FIG. 21. However, the various databases are not indispensable in the file registration terminal 1, and may be provided in, for example, an external storage medium such as a universal serial bus (USB) memory or a database server disposed in a cloud.

Processing functional units in the respective units of the file use unit 11, the access functional unit 12, the node functional unit 13, and the communication unit 14 illustrated in FIG. 2, and the processing functional units in the respective unit of the file use unit 21, the access functional unit 22, the node functional unit 23 and the communication unit 24 illustrated in FIG. 3 can be both realized by causing the hardware processor 111 reading the program stored in the program memory 111B and executing the program. Some or all of these processing functional units may be realized by other various forms including an integrated circuit such as an application specific integrated circuit, (ASIC) or a field-programmable gate array (FPGA).

Further, the scheme described in each embodiment can be stored in, for example, a recording medium such as a magnetic disk (a floppy (registered trademark) disk, a hard disk, or the like), an optical disc (a CD-ROM, a DVD, a MO, or the like), a semiconductor memory (a ROM, a RAM, a Flash memory, or the like) as a program (software means) that can be executed by a computer, and transmitted and distributed by a communication medium. The program stored in the medium side also includes a setting program for configuring, in the computer, software means (including not only an execution program but also a table and the data structure) to be executed by the computer. A calculator realizing the present device executes the above-described processing by loading the program recorded on the recording medium or constructing a software unit using the setting program in some cases, and controlling an operation using the software unit. The recording medium referred to herein is not limited to a recording medium for distribution, and includes a storage medium such as a magnetic disk or a semiconductor memory provided inside the calculator or in a device connected via a network.

The present invention is not limited to the above embodiment, and can be modified in various ways without departing from the gist thereof at an implementation stage. Further, respective embodiment may be combined appropriately and implemented and, in this case, combined effects can be achieved. Further, the foregoing embodiment include various inventions, and various inventions can be extracted by combinations selected from the plurality of components disclosed herein. For example, as long as the problem can be solved and the effects can be achieved even when several of the components described in the embodiment are removed, a configuration in which the components have been removed can be extracted as an invention.

REFERENCE SIGNS LIST

1 File registration unit
2 File holder terminal

3 Distributed ledger network
11, 21 File management unit
12, 22 Access functional unit
13, 23 Node functional unit
14, 24 Communication unit
100 Management system

The invention claimed is:

1. A registration terminal connected to a distributed ledger network, the registration terminal comprising:
   one or more processors; and
   a storage medium having computer program instructions stored therein that, when executed by the one or more processors, perform to:
   generate a public key used for generation of an identifier of a processing target file;
   generate a first transaction related to generation of management information managed in the distributed ledger network and transmit the first transaction to the distributed ledger network to generate the management information in the distributed ledger network;
   generate the identifier of the processing target file as the identifier registered in the management information by using the public key;
   generate the first transaction related to generation of a token managed in the distributed ledger network;
   transmit the first transaction to the distributed ledger network to generate the token in the distributed ledger network;
   generate first information in which information on access to the token and the public key are set in the processing target file;
   generate a random number and generate the identifier of the processing target file by using the random number and the public key;
   generate second information in which the random number is set in the processing target file;
   generate a second transaction related to registration of the identifier in the token and transmit the second transaction to the distributed ledger network to register the identifier in the token;
   divide the processing target file into provisional chunks;
   generate the first information in which the information on access to the token and the public key are set in each of the provisional chunks;
   generate a first random number;
   generate the identifier of the processing target file by using a single provisional chunk that is one of the provisional chunks, the first random number, and the public key;
   generate a second random number used for generation of the identifier by using the public key, the single provisional chunk, and the first random number, for the provisional chunks other than the single provisional chunk;
   create a directed acyclic graph file using the provisional chunks; and
   generate the second information in which the second random number is set in each of the provisional chunks.

2. The registration terminal according to claim 1, wherein the instructions, when executed by the one or more processors, perform to:
   generates a pair of the public key and a private key used for generation of the identifier;
   generate a hash value of the public key as the identifier to be registered in the management information;
   generate the first transaction;
   transmit the first transaction including the identifier to be registered in the management information to the distributed ledger network to generate the management information in the distributed ledger network; and
   generate an electronic signature for a file including information on access to the management information and the public key by using the private key.

3. The registration terminal according to claim 2, wherein the instructions, when executed by the one or more processors, perform to:
   generate management identification information used for management of a file group;
   generate a hash value of the public key and the management identification information as the identifier; and
   generate the electronic signature for a file including the information on access to the management information, the public key, and the management identification information by using the private key.

4. A registration terminal connected to a distributed ledger network in which a token including an identifier of a first processing target file is held, the registration terminal comprising:
   one or more processors; and
   a storage medium having computer program instructions stored therein that, when executed by the one or more processors, perform to:
   generate a second random number used for generation of an identifier of a second processing target file that is an updated file of the first processing target file on the basis of a private key used for generation of the identifier of the first processing target file, the first processing target file, a first random number used for generation of the identifier of the first processing target file, and the second processing target file; and
   generate information in which the second random number is set in the second processing target file;
   generate a first transaction related to generation of a token managed in the distributed ledger network;
   transmit the first transaction to the distributed ledger network to generate a token in the distributed ledger network;
   generate first information in which information on access to the token a public key are set in a processing target file;
   generate a random number and generate the identifier of the processing target file by using the random number and the public key;
   generate second information in which the random number is set in the processing target file;
   generate a second transaction related to registration of the identifier in the token and transmit the second transaction to the distributed ledger network to register the identifier in the token;
   divide the processing target file into provisional chunks;
   generate the first information in which the information on access to the token and the public key are set in each of the provisional chunks;
   generate a first random number;
   generate the identifier of the processing target file by using a single provisional chunk that is one of the provisional chunks, the first random number, and the public key;
   generate a second random number used for generation of the identifier by using the public key, the single provisional chunk, and the first random number, for the provisional chunks other than the single provisional chunk;

create a directed acyclic graph file using the provisional chunks; and generate the second information in which the second random number is set in each of the provisional chunks.

5. The registration terminal according to claim 4, wherein the instructions, when executed by the one or more processors, perform to:

add, to each of the provisional chunks, information on access to the token including the identifier of the first processing target file and a public key used for generation of the identifier of the first processing target file;

apply the private key, a chunk of the first processing target file, and the first random number to each of the provisional chunks to which the information on access to the token and the public key have been added, to generate the second random number; and generate information in which the second random number is set in each of the provisional chunks.

6. A method performed by a registration terminal connected to a distributed ledger network, the registration method comprising:

generating a public key used for generation of an identifier of a processing target file;

generating a first transaction related to generation of management information managed in the distributed ledger network and transmitting the first transaction to the distributed ledger network to generate the management information in the distributed ledger network;

generating the identifier of the processing target file as the identifier registered in the management information by using the public key;

generating the first transaction related to generation of a token managed in the distributed ledger network;

transmitting the first transaction to the distributed ledger network to generate the token in the distributed ledger network;

generating first information in which information on access to the token and the public key are set in the processing target file;

generating a random number and generating the identifier of the processing target file by using the random number and the public key;

generating second information in which the random number is set in the processing target file;

generating a second transaction related to registration of the identifier in the token and transmit the second transaction to the distributed ledger network to register the identifier in the token;

dividing the processing target file into provisional chunks;

generating the first information in which the information on access to the token and the public key are set in each of the provisional chunks;

generating a first random number;

generating the identifier of the processing target file by using a single provisional chunk that is one of the provisional chunks, the first random number, and the public key;

generating a second random number used for generation of the identifier by using the public key, the single provisional chunk, and the first random number, for the provisional chunks other than the single provisional chunk;

creating a directed acyclic graph file using the provisional chunks; and generating the second information in which the second random number is set in each of the provisional chunks.

7. The registration method according to claim 6, wherein the generating of the identifier further includes:

generating a pair of the public key and a private key used for generation of the identifier;

generating a hash value of the public key as the identifier to be registered in the management information, wherein the generating of the management information includes:

generating the first transaction, and transmitting the first transaction including the identifier to be registered in the management information to the distributed ledger network to generate the management information in the distributed ledger network; and generating an electronic signature for a file including information on access to the management information and the public key by using the private key.

8. A non-transitory computer readable storage medium storing the computer program according to claim 1.

9. A non-transitory computer readable storage medium storing the computer program according to claim 4.

* * * * *